United States Patent
Piqueras Jover

(10) Patent No.: US 10,512,103 B2
(45) Date of Patent: Dec. 17, 2019

(54) METHODS AND APPARATUS TO TRANSMIT DATA IN A CONNECTIONLESS MODE

(71) Applicant: AT&T Intellectual Property I, L.P., Atlanta, GA (US)

(72) Inventor: Roger Piqueras Jover, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/823,043

(22) Filed: Nov. 27, 2017

(65) Prior Publication Data

US 2018/0084576 A1 Mar. 22, 2018

Related U.S. Application Data

(63) Continuation of application No. 14/863,414, filed on Sep. 23, 2015, now Pat. No. 9,832,790.

(51) Int. Cl.
*H04W 74/00* (2009.01)
*H04L 12/741* (2013.01)
*H04W 74/08* (2009.01)

(52) U.S. Cl.
CPC ........... *H04W 74/004* (2013.01); *H04L 45/74* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 4,789,980 A | 12/1988 | Darcie et al. | |
| 9,832,790 B2* | 11/2017 | Piqueras Jover | ... H04W 74/004 |
| 2008/0085680 A1* | 4/2008 | Kim | ... H04W 76/048 455/69 |
| 2009/0257349 A1* | 10/2009 | Yamada | ... H04L 45/00 370/228 |
| 2015/0271004 A1 | 9/2015 | Agee et al. | |
| 2016/0014815 A1* | 1/2016 | Vajapeyam | ... H04W 74/0833 370/329 |
| 2016/0088515 A1* | 3/2016 | Griot | ... H04W 28/0289 370/230 |

(Continued)

OTHER PUBLICATIONS

The United States Patent and Trademark Office, "Non-Final Office Action", issued in connection with U.S. Appl. No. 14/863,414, dated Feb. 14, 2017, 13 pages.

(Continued)

*Primary Examiner* — Albert T Chou
(74) *Attorney, Agent, or Firm* — Hanley Flight & Zimmerman, LLC

(57) ABSTRACT

Methods, apparatus, systems and articles of manufacture to transmit data in a connectionless mode are disclosed. An example method includes identifying, at a user equipment, that data exists to be transmitted to a destination address, the destination address encoded into the data. An indication is transmitted that the user equipment will transmit the data, the data to be transmitted without establishing a bearer with a wireless network. The data is encoded into a preamble of a random access channel message. The random access channel message is transmitted.

20 Claims, 12 Drawing Sheets

(56) References Cited

U.S. PATENT DOCUMENTS

2016/0380732 A1* 12/2016 Chung ................. H04L 5/0048
                                                     370/329
2017/0086221 A1   3/2017 Jover

OTHER PUBLICATIONS

The United States Patent and Trademark Office, "Notice of Allowance and Fee(s) Due", issued in connection with U.S. Appl. No. 14/863,414, dated Jul. 28, 2017, 5 pages.

* cited by examiner

US 10,512,103 B2

METHODS AND APPARATUS TO TRANSMIT DATA IN A CONNECTIONLESS MODE

RELATED APPLICATIONS

This patent arises from a continuation of U.S. patent application Ser. No. 14/863,414, which was filed on Sep. 23, 2015, and was granted on Nov. 28, 2017 as U.S. Pat. No. 9,832,790, and is entitled "METHODS AND APPARATUS TO TRANSMIT DATA IN A CONNECTIONLESS MODE". U.S. patent application Ser. No. 14/863,414 is hereby incorporated herein by reference in its entirety.

FIELD OF THE DISCLOSURE

This disclosure relates generally to wireless communication, and, more particularly, to methods and apparatus to transmit data in a connectionless mode.

BACKGROUND

Wireless networks are used to convey data to and/or from wireless mobile devices. Such wireless networks are expected to support billions of wireless devices by 2020. In some cases, signaling overloads caused by these devices disrupt the communications connectivity of those devices.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
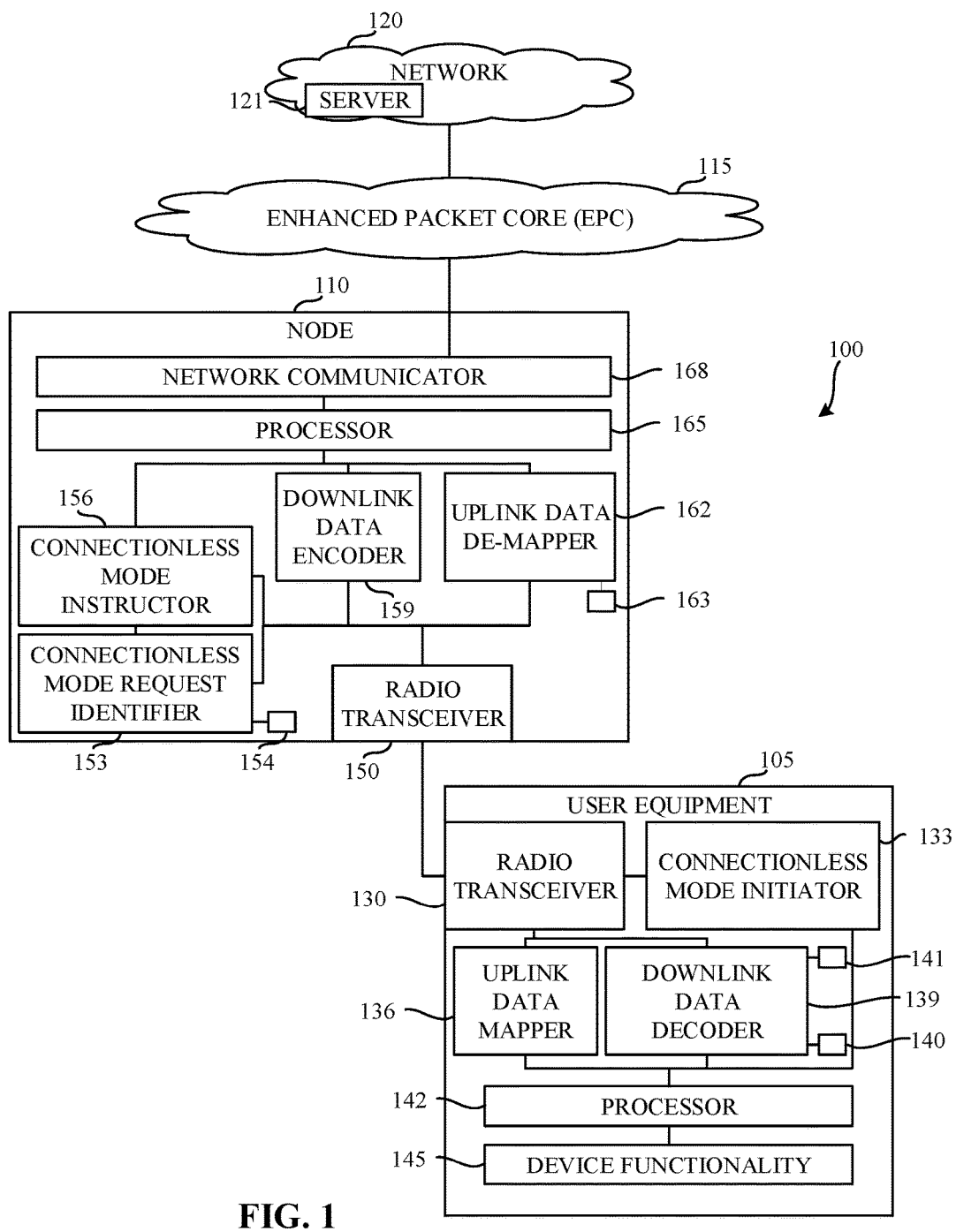
FIG. 1 is a block diagram of an example system 100 constructed in accordance with the teachings of this disclosure to transmit data in a connectionless mode.

Long Term Evolution (LTE) is a wireless network technology that provides advanced communication services to billions of mobile devices. LTE uses an Evolved Packet Core (EPC) that results in an improved core network. However, the EPC is still reliant on legacy circuit-switched architecture(s), with a large amount of signaling required to establish and release circuits (bearers) at the EPC. This circuit-switched approach increases the threat of signaling traffic overloading the network. Moreover, recent research has theorized that such overloads could be leveraged in large-scale signaling-based attacks.

Wireless networks are experiencing a growth as a result of additional wireless devices. For example, Machine to Machine (M2M) systems and/or Internet of Things (IoT) approaches bring connectivity to devices that previously did not have wireless network connectivity, such as, for example, thermostats, refrigerators, vehicles, etc. Many M2M and/or IoT devices (referred to herein as user equipment (UE)) communicate using frequent short messages with, for example, "stay alive" messages and/or periodic communication. For example, a UE, such as a security camera, may transmit a picture once every five minutes. However, using existing systems to transmit such information, the UE first establishes a connection (a bearer) with the wireless network and then transmits the data. In some examples, the connection is a radio resource control (RRC) connection. Afterwards, the device and/or wireless network may terminate the connection to, for example, free up communication channels for other devices.

Because such UEs transmit small amounts of data at frequent intervals, a significant amount of signaling is performed to establish and/or terminate connections for transmitting small amounts of data. This usage pattern results in, for example, network resource utilization inefficiencies, signaling overload, and traffic spikes. Examples disclosed herein enable transmission of data using a connectionless mode by avoiding establishing and terminating connections. As used herein, the connectionless mode is a communication that does not require a radio resource control (RRC) connection (e.g., a bearer) to be established between the UE and the EPC. As such, the wireless network does not need to establish connections (e.g., bearers) between the network and a UE. As used herein, the term data does not refer to instructions and/or parameters communicated between the UE, a network node, and/or the EPC for the purpose of establishing an RRC connection (e.g., a bearer). Instead, the term data refers to information transmitted between a UE and a server (e.g., a server at a destination address on the Internet). As used herein, data may include, for example, an image captured by a UE that is uploaded to a server, an instruction transmitted from a server to a UE to perform an operation (e.g., capture an image, report a sensor reading, etc.), etc.

In examples disclosed herein, techniques are utilized to transmit data via a wireless network while reducing the amount of signaling overhead within the core network.

Examples disclosed herein utilize low level channels mapped on an LTE frame to encode data both in an uplink (UL) direction and a downlink (DL) direction. Examples disclosed herein encode data within physical layer (PHY) channels to achieve additional data throughput as compared to known signaling techniques. For example, by encoding data in PHY channels, additional throughputs of 16 Kilobits per second in the downlink, and 3.84 Kilobits in the uplink may be achieved. Such additional throughputs are useful for communication of data that use low throughput and is delay tolerant such as, for example, M2M applications (e.g., remote security cameras, status check systems sending a stay alive message periodically, fleet location trackers reporting coordinates periodically, etc.). The additional throughputs are useful because they provide for additional data to be transmitted without the need to establish a connection. As a result, connections which would otherwise be established by the UE remain available for other UEs (e.g., smartphones).

To enable data to be transmitted in a connectionless mode, examples disclosed herein utilize random access channel (RACH) procedure message(s), radio access response (RAR) message(s), and paging message(s). In existing systems, RACH messages are used to attach a UE to a network and/or to transition to a connected state. The RACH procedure is based on the transmission of a set of messages (e.g., RACH preambles) that contain a randomly selected signature. In examples disclosed herein, there are sixty-four available signatures that are represented using six binary digits. As a result, each signature can encode six bits of data. However, any other number of signatures may additionally or alternatively be used in accordance with any past, present, and/or future signaling protocols.

In examples disclosed herein, the UE transmits an initial RACH message and/or a pattern of RACH messages to identify that the UE will transmit data using the connectionless mode. In examples disclosed herein, the RACH message includes a preamble and an identifier of the UE such as, for example, a media access control (MAC) address, an international mobile subscriber identity (IMSI), etc. The UE then encodes the data to be sent into RACH preamble(s) and transmits RACH messages including those preamble(s). In examples disclosed herein, the six bits of data encoded by the RACH preamble are used to transmit data in an uplink fashion. In examples disclosed herein, the RACH message is transmitted using the RACH physical channel. However, any other approach to transmitting the RACH message may additionally or alternatively be used.

Upon reception of the RACH message(s), a base station generates a RAR message that is sent on the Physical Downlink Shared Channel (PDSCH). The RAR message contains an identification of a time-frequency slot where the preamble was received, known as a random access radio network temporary identifier (RA-RNTI), the identification of the preamble itself (signature), the UE identifier (e.g., the UE identifier transmitted in the RACH message), and a physical layer identification assigned to the UE (Cell-RNTI or C-RNTI). In examples disclosed herein, the C-RNTI field enables encoding of sixteen bits of downlink traffic in each RAR message. In existing systems, the C-RNTI field is not used to transmit information prior to a bearer being established. In examples disclosed herein, the C-RNTI, is used to transmit data in a downlink fashion.

In some examples, communication originates from a server (e.g., a server of an IoT service provider) and is directed towards a UE. Paging messages are used to notify UE(s) as to when the UE(s) should connect to the network. In existing systems, paging messages include three tail bits; however, any number of tail bits may be used. In existing systems, the tail bits are each set to zero. In examples disclosed herein, the tail bits are used to instruct a UE to receive downlink data using the connectionless mode. In some examples, the paging message may be transmitted from multiple nodes simultaneously or near simultaneously to, for example, ensure that if the UE was physically moved to a different node within the wireless network that the UE is properly notified to connect and/or receive data.

In some examples, different combinations of tail bits are used to instruct the UE regarding how the downlink transmission will be configured. For example, a first tail bit may be set to a binary one to indicate that connectionless mode is to be used. In some examples, the second and/or third tail bits are used to indicate a number of messages that the UE should receive. For example, a binary zero-zero in the second and third bits may indicate that the UE is to receive ten segments of downlink data, a binary zero-one in the second and third bits may indicate that the UE is to receive twenty segments of downlink data, a binary one-zero in the second and third bits may indicate that the UE is to receive thirty segments of downlink data, a binary one-one in the second and third bits may indicate that the UE is to receive forty segments of downlink data. Of course, the binary values for the second and/or third tail bits may correspond to any other number of segments to be received by the UE. Moreover, in some examples, the second and/or third tail bits are used to indicate a type of encryption and/or encoding of the data to be transmitted to the UE.

FIG. 1 is a block diagram of an example system 100 constructed in accordance with the teachings of this disclosure to transmit data in a connectionless mode. The example system 100 of FIG. 1 includes user equipment (UE) 105 and a network node 110. The example UE 105 communicates with the node 110 which, in turn, communicates with an enhanced packet core (EPC) 115 and, ultimately, a network 120 (e.g., the Internet).

In examples disclosed herein, the example UE 105 is implemented by an Internet of Things (IoT) device. However, the example UE 105 may be implemented in any other fashion and/or by any other device. For example, the UE 105 may be implemented as a security camera, a thermostat, an irrigation controller, a smartphone, etc. The example UE 105 includes a radio transceiver 130, a connectionless mode initiator 133, an uplink data mapper 136, a downlink data decoder 139, a buffer 140, a counter 141, a processor 142, and device functionality 145.

The example radio transceiver 130 of the illustrated example of FIG. 1 is a wireless radio transceiver implemented using an LTE protocol. However, any other past, present, and/or future radio protocol may additionally or alternatively be used. In the illustrated example of FIG. 1, the example radio transceiver 130 communicates with the node 110 using wireless communications. However, in some examples, the example radio transceiver 130 may communicate using wired communications (e.g., over a wired connection).

The example connectionless mode initiator 133 of the illustrated example of FIG. 1 initiates a connectionless mode communication between the UE 105 and the node 110. In examples disclosed herein, the example connectionless mode initiator 133 transmits, via the radio transceiver 130, messages (e.g., RACH messages) to indicate that the UE 105 will communicate in the connectionless mode (e.g., without establishing a bearer with the EPC 115). In examples disclosed herein, the example connectionless mode initiator 133 transmits a sequence of RACH messages to indicate that the UE 105 will transmit data in the connectionless mode. In examples disclosed herein, a number of RACH messages in the sequence of RACH messages is used to indicate a number of subsequent RACH messages that will be used to communicate data using the connectionless mode. However, the connectionless mode initiator 133 may indicate a number of RACH messages that will be used to communicate data in any other fashion such as, for example, by encoding a number representing the number of RACH messages that will be used to communicate data into one or more RACH messages.

In some examples, the connectionless mode initiator 133 monitors for paging messages from the node 110. In some examples, a paging message includes one or more tail bits that indicate that connectionless mode is to be used. In some examples, the paging message includes tail bits to indicate a number of messages to be transmitted in a downlink fashion. The connectionless mode initiator 133, upon receiving a paging message indicating that the connectionless mode is to be used, instructs the downlink data decoder 139 to request the downlink data from the node 110.

The example uplink data mapper 136 of the illustrated example of FIG. 1 maps data to be transmitted from the UE 105 to the node 110 via the connectionless mode into segments. In examples disclosed herein, the data to be transmitted originates from the processor 142 and/or the device functionality 145 of the UE 105 and is not data that is used to establish a connection. In examples disclosed herein, the segments are six bits in length corresponding to six bits of a preamble of a RACH message; however, any other length may be used. The example uplink data mapper 136 maps the segmented data into respective preambles of RACH messages. Once the example connectionless mode initiator 133 has initiated the connectionless mode, the example uplink data mapper 136 transmits, via the radio transceiver 130, RACH messages including the respective preambles.

The example downlink data decoder 139 of the illustrated example of FIG. 1 accesses downlink data received at the UE 105 from the node 110. In examples disclosed herein, the example downlink data decoder 139 requests the downlink data from the node 110 using a RACH message. In response to the RACH message, the node 110 responds with a RAR message. In some examples, the RAR message includes connectionless mode data encoded in a field within the RAR message. In some examples, the field is an RNTI field of the RAR message. However, any other field may additionally or alternatively be used.

In the illustrated example of FIG. 1, the example downlink data decoder 139 is in communication with the buffer 140 and the counter 131. In examples disclosed herein, the buffer 140 is used to aggregate segments of data received from the node 110. As additional segments of data are received from the node 110, the example downlink data decoder 139 of FIG. 1 adds the data from those segments to the buffer 140. In the illustrated example, the buffer 140 is implemented by random access memory of the UE 105. In examples disclosed herein, data is stored in the buffer 140 in a binary format. However, the data stored in the buffer 140 may be in any data format such as, for example, comma delimited data, tab delimited data, structured query language (SQL) structures, etc. While in the illustrated example the buffer 140 is illustrated as a single memory device/location, the example buffer 140 may be implemented by multiple memory devices, and/or be stored in multiple memory locations of the UE 105.

In examples disclosed herein, the counter 141 is used to store a count of an expected number of incoming segments to be received from the node 110. As additional segments of data are received from the node 110, the example downlink data decoder 139 of FIG. 1 decrements the counter 141 to, for example, identify when no additional messages are expected. In the illustrated example, the counter 141 is implemented by random access memory of the UE 105. In examples disclosed herein, the counter 141 stores a count in a hexadecimal format. However, any other format may additionally or alternatively be used such as, for example, binary format, a decimal format, etc. While in the illustrated example the counter 141 is illustrated as a single memory device/location, the example counter 141 may be implemented by multiple memory devices, and/or be stored in multiple memory locations of the UE 105.

The example processor 142 of the illustrated example of FIG. 1 processes data to be sent to the node 110 and/or processes data received from the node 110. In some examples, the example processor 142 encrypts data to be sent and/or decrypts received data. Encrypting the data reduces the likelihood that another device might be able to determine the data transmitted between the UE 105 and the node 110. The example processor 142 interacts with the device functionality 145.

The example device functionality 145 of the illustrated example of FIG. 1 includes any functionality included for a particular UE 105. For example, if the UE 105 were a security camera, the device functionality 145 may include an image sensor, a button, a motor to position the image sensor, etc. If, for example, the UE 105 were a thermostat, the device functionality may include a temperature sensor, a display, and one or more switches for controlling a heating, ventilation, and air-conditioning (HVAC) system.

The example node 110 of the illustrated example is implemented by an eNodeB LTE wireless access point. However, the example node 110 may be implemented in any other fashion. For example, the example node 110 may be implemented using any past, present, and/or future network element(s). The example node 110 of the illustrated example of FIG. 1 includes a radio transceiver 150, a connectionless mode request identifier 153, a counter 154, a connectionless mode instructor 156, a downlink data encoder 159, an uplink data de-mapper 162, a buffer 163, a processor 165, and a network communicator 168.

The example radio transceiver 150 of the illustrated example of FIG. 1 is a wireless radio transceiver implemented using a long term evolution (LTE) protocol. However, any other past, present, and/or future radio protocol may additionally or alternatively be used. In the illustrated example of FIG. 1, the example radio transceiver 150 communicates with the UE 105 using wireless communications. However, in some examples, the example radio transceiver 150 may communicate using wired communications (e.g., over a wired connection).

The example connectionless mode request identifier 153 of the illustrated example of FIG. 1 identifies messages received from the UE 105 that indicate that the UE 105 is about to transmit data using the connectionless mode. In examples disclosed herein, the example connectionless mode request identifier 153 identifies sequences of RACH messages received from the UE 105 to identify that the UE 105 has initiated communication using the connectionless mode. In examples disclosed herein, the sequence of RACH messages includes multiple RACH messages from the same UE 105, each having a same preamble. Moreover, a number of messages to be sent by the UE 105 using the connectionless mode may be identified by, for example, identifying a number of RACH messages in the sequence of RACH messages having the same preamble. However, any other approach to identifying that the UE 105 will communicate using the connectionless mode and/or a number of messages that the UE 105 will send using the connectionless mode may additionally or alternatively be used.

In the illustrated example of FIG. 1, the example connectionless mode request identifier 153 is in communication with the counter 154. In examples disclosed herein, the counter 154 is used to store a count of an expected number of incoming segments to be received from the UE 105. As RACH messages are received from the UE 105 indicating a number of RACH messages to be transmitted by the UE 105 that include data, the example connectionless mode request identifier 153 increments the example counter 154. As additional segments of data are received at the node 110 from the UE 105, the example downlink data decoder 139 of FIG. 1 decrements the counter 154 to, for example, identify when no additional messages are expected. In the illustrated example, the counter 154 is implemented by random access memory of the node 110. In examples disclosed herein, the counter 154 stores a count in a hexadecimal format. However, any other format may additionally or alternatively be used such as, for example, binary format, a decimal format, etc. While in the illustrated example the counter 154 is illustrated as a single memory device/location, the example counter 154 may be implemented by multiple memory devices, and/or be stored in multiple memory locations of the node 110.

The example connectionless mode instructor 156 of the illustrated example of FIG. 1 identifies that data is to be sent to the UE 105 in a downlink fashion. To send the downlink data, the example connectionless mode instructor 156 transmits, via the radio transceiver 150, a paging message indicating that connectionless mode data will be transmitted. In examples disclosed herein, tail bits of the paging message(s) (which are otherwise unused in existing communications systems) are used to instruct the UE 105 to receive downlink data using the connectionless mode.

In some examples, different combinations of tail bits are used to instruct the UE as to how the downlink transmission will be configured. For example, a first tail bit may be set to a binary one to indicate that connectionless mode is to be used. In some examples, the second and/or third tail bits are used to indicate a number of messages that the UE should receive. Moreover, in some examples, the second and/or third tail bits are used to indicate a type of encryption and/or encoding of the data to be transmitted to the UE.

The example downlink data encoder 159 of the illustrated example of FIG. 1 encodes data to be transmitted from the node 110 to the UE 105 into segments. In examples disclosed herein, the segments are sixteen bits in length corresponding to sixteen bits available within a RNTI field of a RAR message. However, any other field having any other length may additionally or alternatively be used. The example downlink data encoder 159 encodes the segmented data into respective RNTI fields of RAR messages. Once the example downlink data encoder 159 receives a RACH message from the UE 105, the example downlink data encoder 159 responds with the RAR message including the encoded data. In examples disclosed herein, the downlink data is shared among multiple UEs communicating with the node 110.

The example uplink data de-mapper 162 of the illustrated example of FIG. 1 de-maps data received from the UE 105. In examples disclosed herein, the example uplink data de-mapper 162 accesses data encoded within RACH messages received from the UE 105. However, any other past, present, and/or future message and/or message type may additionally or alternatively be used to communicate data from the UE 105 to the node 110. In some examples, the uplink data de-mapper 162 responds to the RACH message with a RAR message. However, the example uplink data de-mapper 162 may respond using any past, present, and/or future message and/or message type. In some examples, the RAR message may be used to, for example, acknowledge receipt of the RACH message, indicate that the RACH message was corrupted and should be re-transmitted, transmit downlink data to the UE 105, indicate that the node 110 did not receive the expected number of segments in the second sequence of RACH messages (e.g., to trigger a re-transmission of one or more of the segments), etc. In some examples, the RAR message includes connectionless mode downlink data encoded in a field within the RAR message. In some examples, the field is an RNTI field of the RAR message. However, any other field may additionally or alternatively be used. In examples disclosed herein, the uplink data is shared among multiple UEs communicating with the node 110.

In the illustrated example of FIG. 1, the example uplink data de-mapper 162 is in communication with the buffer 163. In examples disclosed herein, the buffer 163 is used to aggregate segments of data received from the UE 105. As additional segments of data are received at the node 110 from the UE 105, the example uplink data de-mapper 162 of FIG. 1 adds the data from those segments to the buffer 163. In the illustrated example, the buffer 163 is implemented by random access memory of the node 110. In examples disclosed herein, data is stored in the buffer 163 in a binary format. However, the data stored in the buffer 163 may be in any data format such as, for example, comma delimited data, tab delimited data, structured query language (SQL) structures, etc. While in the illustrated example the buffer 163 is illustrated as a single memory device/location, the example buffer 163 may be implemented by multiple memory devices, and/or be stored in multiple memory locations of the node 110.

The example processor 165 of the illustrated example of FIG. 1 processes data received from the UE 105. In some examples, the example processor 165 encrypts data to be sent to the UE 105 and/or decrypts received from the UE 105. Encrypting and/or decrypting the data reduces the likelihood that another device might be able to determine the data transmitted between the UE 105 and the node 110. In some examples, the processor 165, upon detection that the UE 105 will communicate using the connectionless mode, may negotiate an encryption standard and/or encryption key to be used for the communication. The example processor 165 interacts with the network communicator 168 to transmit received data to a destination (e.g., a server of an IoT service provider).

The example network communicator 168 of the illustrated example of FIG. 1 communicates with the EPC 115 to transmit data to a destination (e.g., a server of the IoT service provider) on the network 120 (e.g., the Internet). In some examples, the network communicator 168 bypasses the EPC 115 and, instead, communicates directly and/or indirectly with the network 120 (e.g., the Internet) (e.g., via an Internet Service Provider (ISP) such as, for example a cable Internet provider, a digital subscriber line (DSL) provider, etc.). In some examples, the data received at the node 110 is transmitted to and/or received from a server (e.g., the server of the IoT service provider). In some examples, the data may be formatted as an Ethernet packet and may specify a destination address of the server (e.g., in a header of the received data). However, any other approach to specifying a destination may additionally or alternatively be used.

The EPC 115 of the illustrated example of FIG. 1 is implemented by an LTE core network. In known systems, when the UE 105 is to transmit or receive data, the UE 105 must first form a connection with the EPC 115. In examples disclosed herein, the EPC includes multiple signaling components such as, for example a mobility management engine (MME), a home subscriber server (HSS), a gateway, a firewall, etc. To initialize and/or destroy a connection with the UE 105, components within the EPC exchange messages (e.g., an update location request, an update location response, a create session request, a create session response, a modify bearer request, a modify bearer response, etc.). Networking inefficiencies become apparent when a UE connects to an EPC to only transmit a small amount of data. If, for example, a large number of UEs (e.g., one hundred UEs, one thousand UEs, etc.) were to connect within a short time period (e.g., within one second, within one minute, etc.) signaling overloads and/or traffic spikes may result, despite those UEs requesting to transmit small amounts of data (e.g., a ten kilobyte image, a five hundred byte status message, etc.) Examples disclosed herein eliminate the need for intra-EPC communications for transmissions of small amounts of data (e.g., data communicated using the connectionless mode). In some examples, the example node 110 establishes an open bearer (e.g., a perpetual bearer connection) between the node 110 and, for example, a gateway of the EPC 115. The open bearer is used to tunnel and/or route the communications from the node 110 to the network 120.

In examples disclosed herein, data is communicated to and/or from the network 120. In examples disclosed herein, the network 120 is a public network such as, for example, the Internet. However, in some examples, the network 120 may be implemented as a private area network such as, for example, a local area network (LAN), a virtual private network (VPN), etc. In examples disclosed herein, a IoT service provider hosts a server 121 on the network 120. In some examples, the IoT service provider interacts with a service provider (e.g., a cellular provider hosting the EPC 115 and/or the node 110). Such interaction may enable, for example, the IoT service provider to communicate directly with the node 110 to, for example initiate a downlink message to be transmitted to the UE 105 and/or directly receive data from the UE 105.

Figure 2:
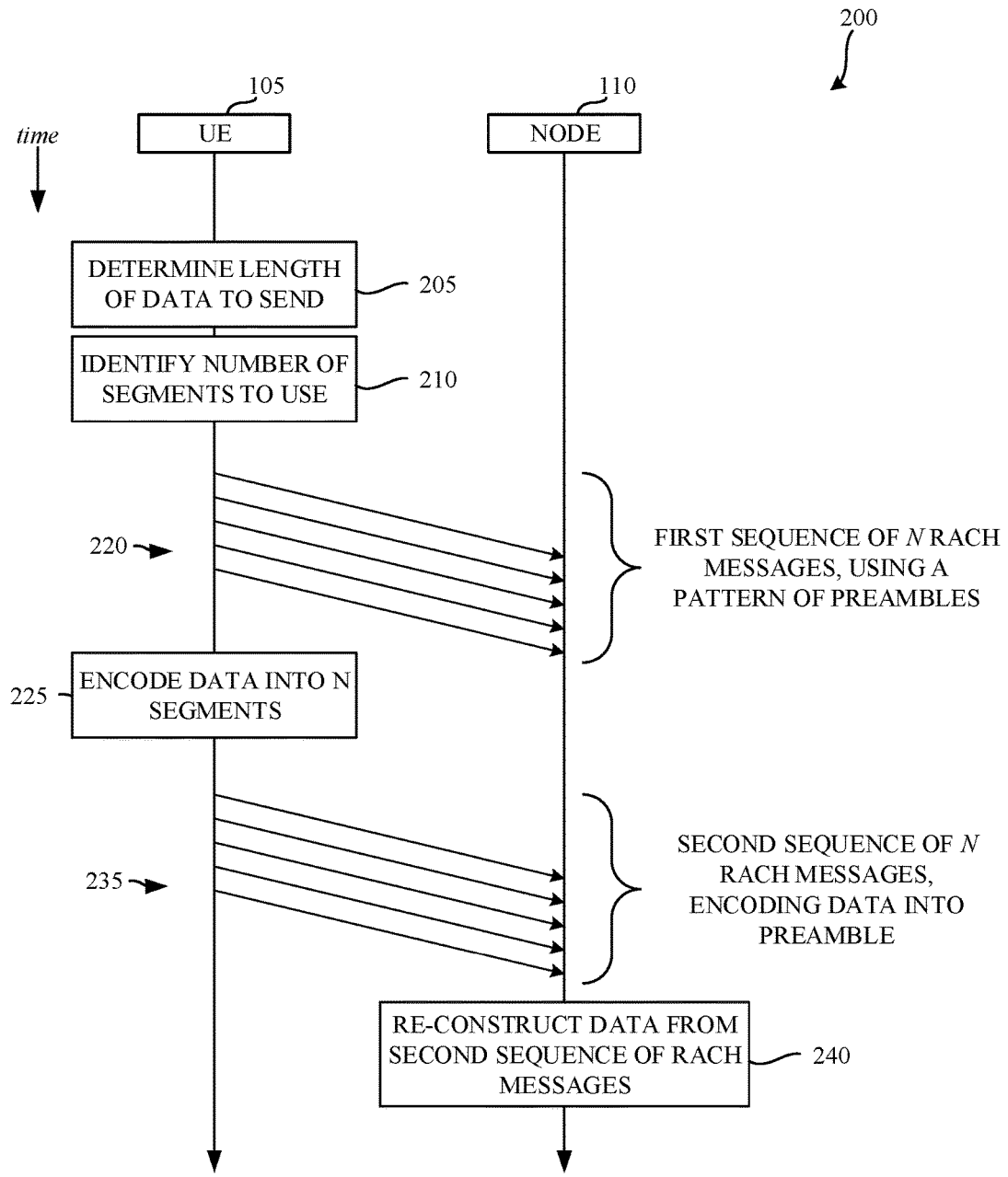
FIG. 2 is a communication diagram illustrating an example approach to transmitting uplink initiated data from the example UE to the example node of FIG. 1 in a connectionless mode.

FIG. 2 is a communication diagram 200 illustrating an example approach to transmitting uplink initiated data from the example UE 105 to the example node 110 of FIG. 1 in a connectionless mode. The example communication diagram begins when the UE 105 determines a length of data to be sent to the node 110 (Block 205). In examples disclosed herein, the UE 105 determines the length in bits. However, any other measurement such as, for example, words, bytes, etc. may additionally or alternatively be used. The example UE 105 identifies a number of segments that will be used to transmit the data to the node 110 (Block 210). In examples disclosed herein, the number of segments is identified by dividing the length of the data to be transmitted by the length of the preamble used in a RACH message (e.g., six bits). To ensure that all data is transmitted, in the event that a fractional number of segments is identified, the number of segments may be rounded up to the next whole number.

The UE 105 then sends a first sequence of RACH messages to inform the node 110 that the UE 105 will be sending data using the connectionless mode (220). In examples disclosed herein, a same signature and/or preamble is used in each of the RACH messages. However, any other signature and/or preamble may additionally or alternatively be used. For example, the UE 105 may transmit a pattern of signatures and/or preambles to identify to the node 110 that it will be communicating in the connectionless mode.

In examples disclosed herein, the example UE 105 identifies the number of segments to be transmitted by sending a corresponding number of RACH messages. In the illustrated example of FIG. 2, five RACH messages are transmitted corresponding to five segments of data to be transmitted. However, any other number of RACH messages may be used. For example, an example hypertext transfer protocol (HTTP) message transmitted using a transmission control protocol (TCP) may have a length of three thousand and two hundred bits. When a signature length of six bits is used, the HTTP message may be segmented into five hundred and thirty four segments. In such an example, the example UE 105 would transmit five hundred and thirty four RACH messages to indicate that five hundred and thirty four messages encoding data should be expected. However, any other approach to informing the node 110 that the UE 105 will be communicating using the connectionless mode and/ or a number of segments the UE 105 will be communicating may additionally or alternatively be used. For example, the UE may select RACH preamble messages to identify a number of messages that the node 110 should expect to receive. For example, after communicating an indication that connectionless mode will be used, the example UE 105 may transmit a signature (and/or sequence of signatures) to indicate a number of segments to be transmitted by the UE 105.

The example UE 105 encodes the data to be transmitted into N segments (Block 225). The example UE 105 then sends a second sequence of RACH messages, each having a segment of the data to be sent encoded into the preamble field of the RACH message (235). The example node 110 then re-constructs data received via the preambles of the second sequence of RACH messages (Block 240).

In some examples, upon receipt of each of the RACH messages, the example node 110 may respond via a RAR message. The RAR message may be used to, for example, acknowledge receipt of the RACH message, indicate that the RACH message was corrupted and should be re-transmitted, transmit downlink data to the UE 105, indicate that the node 110 did not receive the expected number of segments in the second sequence of RACH messages (e.g., to trigger a re-transmission of one or more of the segments), etc.

Figure 3:
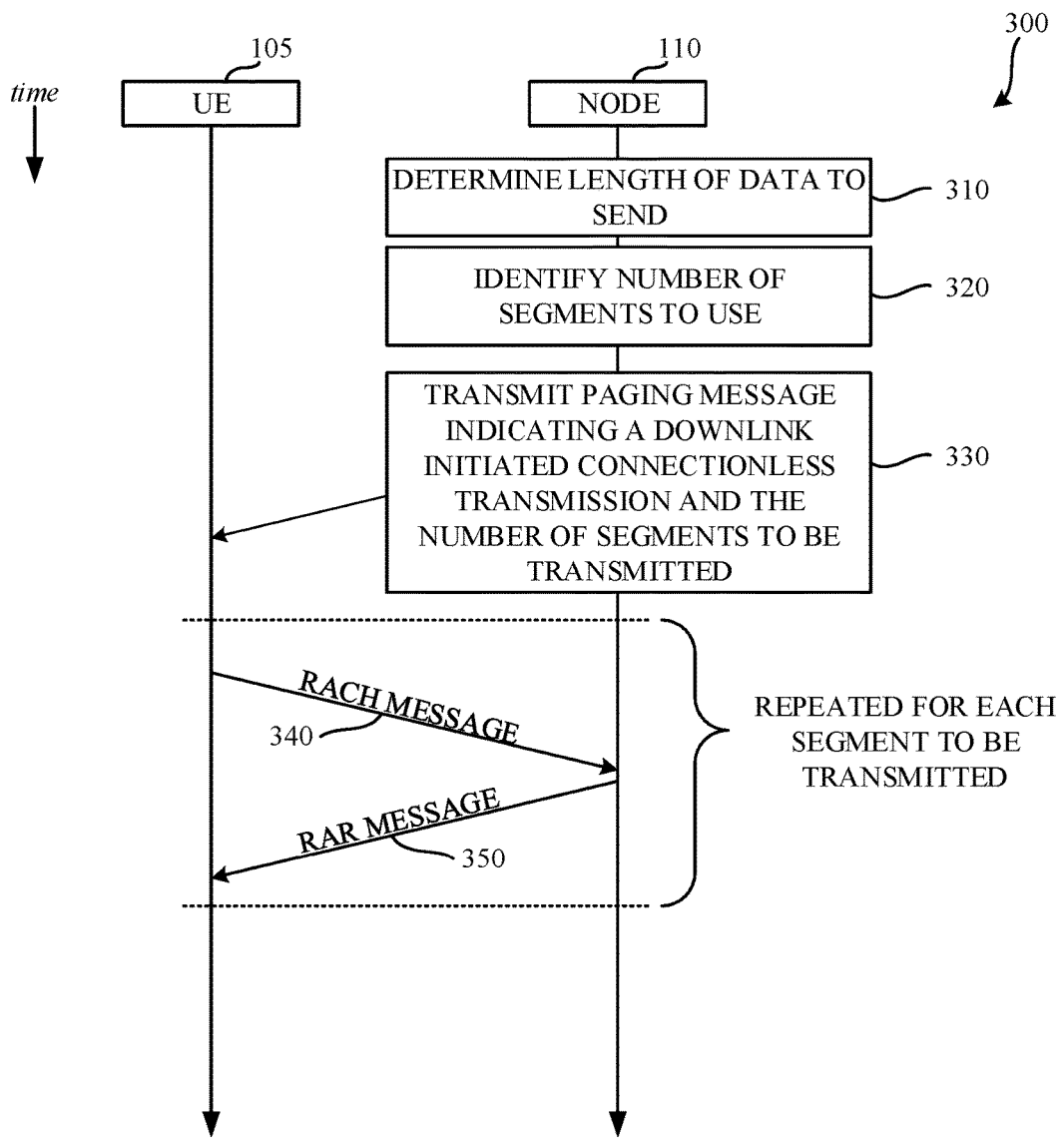
FIG. 3 is a communication diagram illustrating an example approach to transmitting downlink-initiated data from the example node to the example UE of FIG. 1 in a connectionless mode.

FIG. 3 is a communication diagram 300 illustrating an example approach to transmitting downlink initiated data from the example node 110 to the example UE 105 of FIG. 1 in a connectionless mode. In the illustrated example of FIG. 3, the example node 110 determines a length of data that is to be sent to the UE 105 (Block 310). In examples disclosed herein, the node 110 determines the length in bits. However, any other measurement such as, for example, words, bytes, etc. may additionally or alternatively be used. The example node 110 identifies a number of segments that will be used to transmit the data to the UE 105 (Block 320). In examples disclosed herein, the number of segments is identified by dividing the length of the data to be transmitted by the length of an RNTI field used in the RAR message (e.g., sixteen bits). To ensure that all data is transmitted, in the event that a fractional number of segments is identified, the number of segments may be rounded up to the next whole number.

The node 110 then transmits a paging message to the UE 105 to indicate that the UE 105 is to receive downlink data in a connectionless mode (Block 330). In the illustrated example of FIG. 3, the paging message indicates a number of segments to be transmitted. As discussed below in connection with FIG. 4, other approaches to informing the UE 105 of a number of segments to be transmitted may additionally or alternatively be used.

Having received the paging message, the UE 105 responds with a RACH message (340). In response to the RACH message, the node 110 responds with a RAR message (350). In examples disclosed herein, the RAR message of line 350 includes a segment of the data to be transmitted in an RNTI field. However, any other field within the RAR message, and/or more generally, any other response message, may additionally or alternatively be used. The RACH message and RAR message procedure (illustrated by line 340 and line 350) is repeated for each segment to be transmitted (as identified in the paging message).

Figure 4:
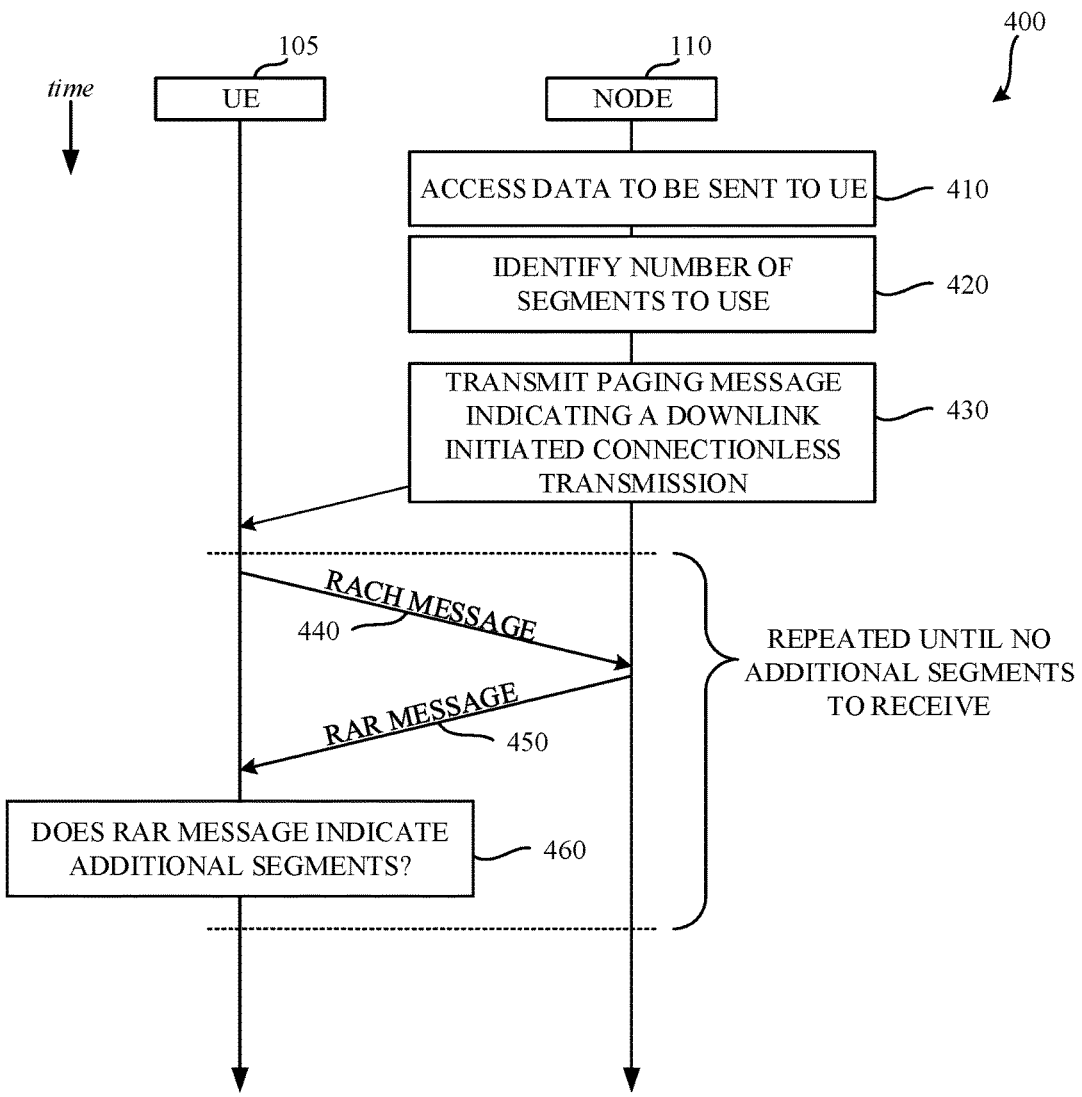
FIG. 4 is a communication diagram illustrating an example alternative approach to transmitting downlink-initiated data from the example node to the example UE of FIG. 1 in a connectionless mode.

FIG. 4 is a communication diagram 400 illustrating an example alternative approach to transmitting downlink initiated data from the example node 110 to the example UE 105 of FIG. 1 in a connectionless mode. In the illustrated example of FIG. 4, the example node 110 determines a length of data that is to be sent to the UE 105 (Block 410). In examples disclosed herein, the node 110 determines the length in bits. However, any other measurement such as, for example, words, bytes, etc. may additionally or alternatively be used. The example node 110 identifies a number of segments that will be used to transmit the data to the UE 105 (Block 420). In examples disclosed herein, the number of segments is identified by dividing the length of the data to be transmitted by the length of the RNTI field used in the RAR message (e.g., sixteen bits). To ensure that all data is transmitted, in the event that a fractional number of segments is identified, the number of segments may be rounded up to the next whole number.

The node 110 then transmits a paging message to the UE 105 to indicate that the UE 105 is to receive downlink data in a connectionless mode (Block 430). In the illustrated example of FIG. 3, the paging message does not indicate a number of segments to be transmitted. In examples disclosed herein, the paging message may indicate, for example, whether encryption is used and/or an encryption type used, an encoding type, etc.

Having received the paging message, the UE 105 responds with a RACH message (440). In response to the RACH message, the node 110 responds with a RAR message (350). In examples disclosed herein, the RAR message of line 350 includes a segment of the data to be transmitted in an RNTI field. In some examples, the RNTI field is a C-RNTI field. However, any other field within the RAR message, and/or more generally, any other response message, may additionally or alternatively be used. In the illustrated example of FIG. 4, the example RAR message includes an indication of whether additional segments are to be transmitted. The example UE 105 inspects the indication of whether additional segments are to be transmitted to, for example, determine whether to transmit a subsequent RACH message. The RACH message and RAR message procedure (illustrated by line 440 and line 450) is repeated until a RAR message indicating that no additional segments are to be transmitted is received as the UE 105.

While example manners of implementing the UE 104 and/or the node 110 are illustrated in FIG. 1, one or more of the elements, processes and/or devices illustrated in FIG. 1 may be combined, divided, re-arranged, omitted, eliminated and/or implemented in any other way. Further, the example radio transceiver 130, the example connectionless mode initiator 133, the example uplink data mapper 136, the example downlink data decoder 139, the example buffer 140, the example counter 141, the example processor 142, the example device functionality 145, and/or, more generally, the example UE 105 of FIG. 1, and/or the example radio transceiver 150, the example connectionless mode request identifier 153, the example counter 154, the example connectionless mode instructor 156, the example downlink data encoder 159, the example uplink data de-mapper 162, the example received data buffer 163, the example processor 165, the example network communicator 168, and/or, more generally the example node 110 of FIG. 1 may be implemented by hardware, software, firmware and/or any combination of hardware, software and/or firmware. Thus, for example, any of the example radio transceiver 130, the example connectionless mode initiator 133, the example uplink data mapper 136, the example downlink data decoder 139, the example buffer 140, the example counter 141, the example processor 142, the example device functionality 145, and/or, more generally, the example UE 105 of FIG. 1, and/or the example radio transceiver 150, the example connectionless mode request identifier 153, the example counter 154, the example connectionless mode instructor 156, the example downlink data encoder 159, the example uplink data de-mapper 162, the example received data buffer 163, the example processor 165, the example network communicator 168, and/or, more generally the example node 110 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example radio transceiver 130, the example connectionless mode initiator 133, the example uplink data mapper 136, the example downlink data decoder 139, the example buffer 140, the example counter 141, the example processor 142, the example device functionality 145, and/or, more generally, the example UE 105 of FIG. 1, and/or the example radio transceiver 150, the example connectionless mode request identifier 153, the example counter 154, the example connectionless mode instructor 156, the example downlink data encoder 159, the example uplink data de-mapper 162, the example buffer 163, the example processor 165, the example network communicator 168, and/or, more generally the example node 110 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example UE 105 of FIG. 1 and/or the example node of FIG. 1 may include one or more elements, processes and/or devices in addition to, or instead of, those illustrated in FIG. 1, and/or may include more than one of any or all of the illustrated elements, processes and devices.

Figure 5:
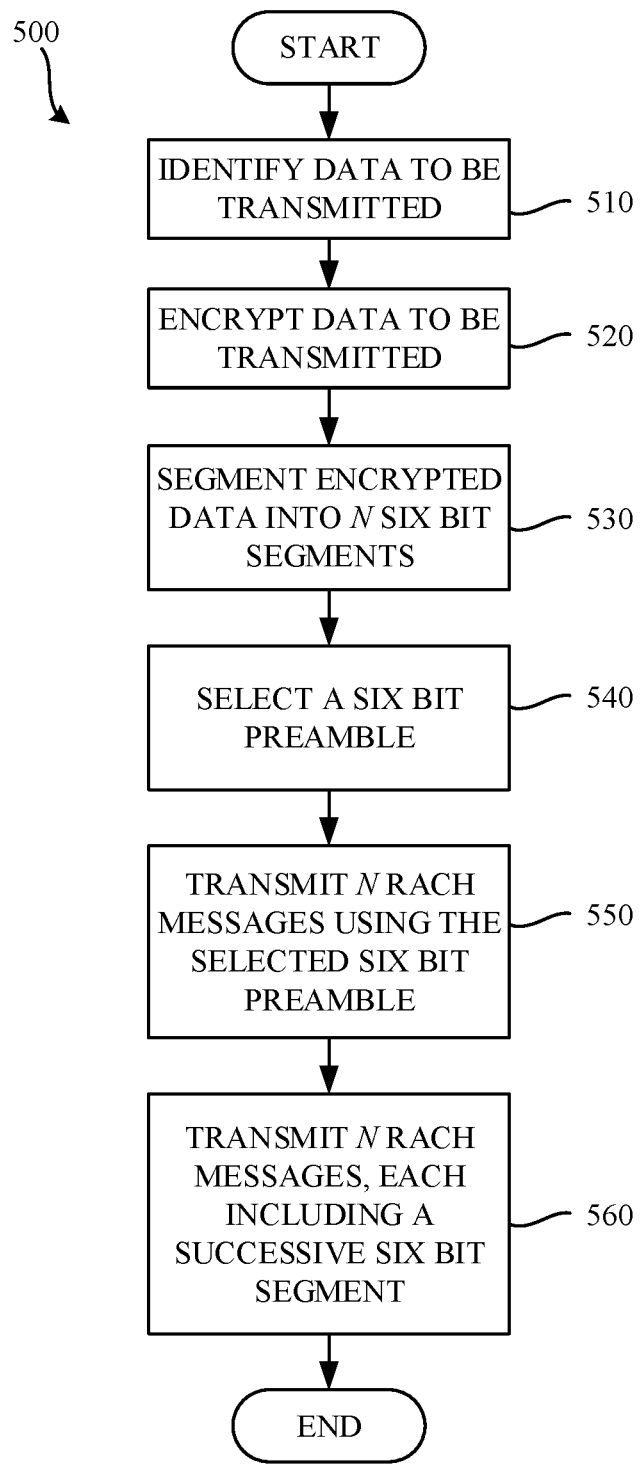
FIG. 5 is a flowchart representative of example machine-readable instructions which may be executed to implement the example UE of FIG. 1 to transmit uplink data.
Figure 8:
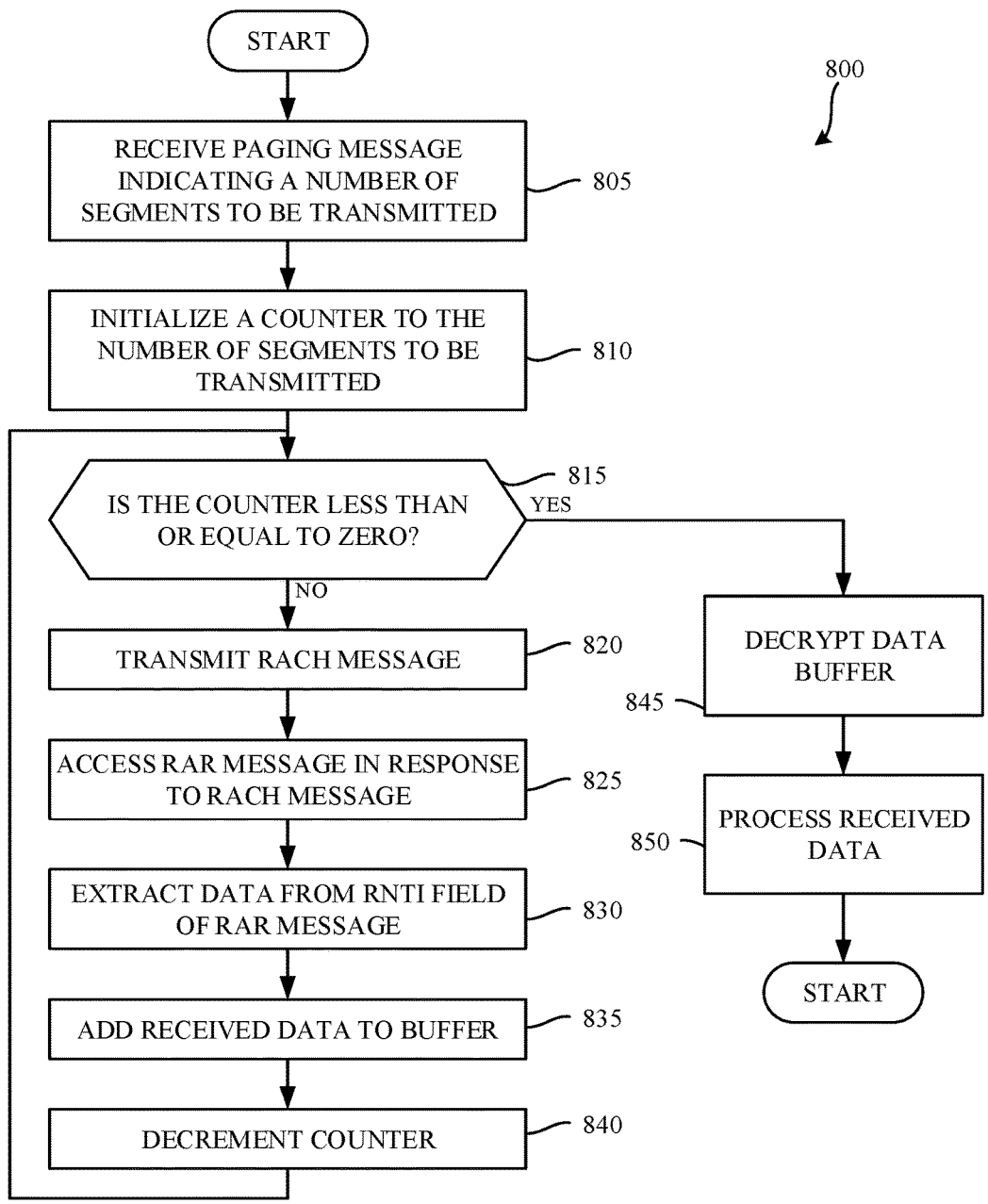
FIG. 8 is a flowchart representative of example machine-readable instructions which may be executed to implement the example UE of FIG. 1 to receive downlink data.

Flowcharts representative of example machine readable instructions for implementing the example UE 105 of FIG. 1 are shown in FIGS. 5, 8 and/or 10. In these examples, the machine readable instructions comprise a program(s) for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program(s) and/or parts thereof could alternatively be executed by a device other than the processor 1112 and/or embodied in firmware or dedicated hardware. Further, although the example program(s) is/are described with reference to the flowchart(s) illustrated in FIGS. 5, 8, and/or 10, many other methods of implementing the example UE 105 may alternatively be used. For example, the order of execution of the blocks may be changed, and/or some of the blocks described may be changed, eliminated, or combined.

Figure 6:
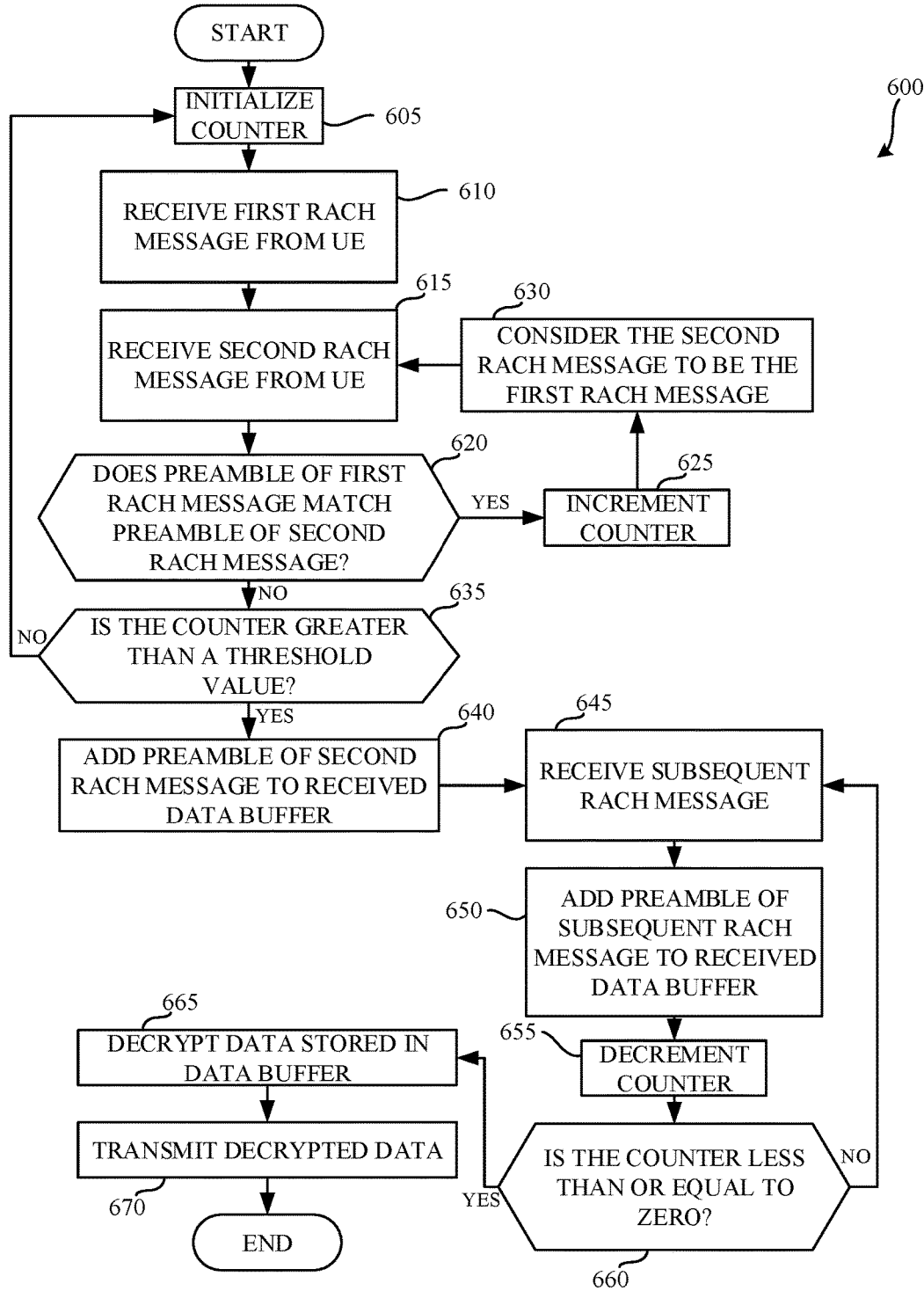
FIG. 6 is a flowchart representative of example machine-readable instructions which may be executed to implement the example node of FIG. 1 to receive uplink data.
Figure 7:
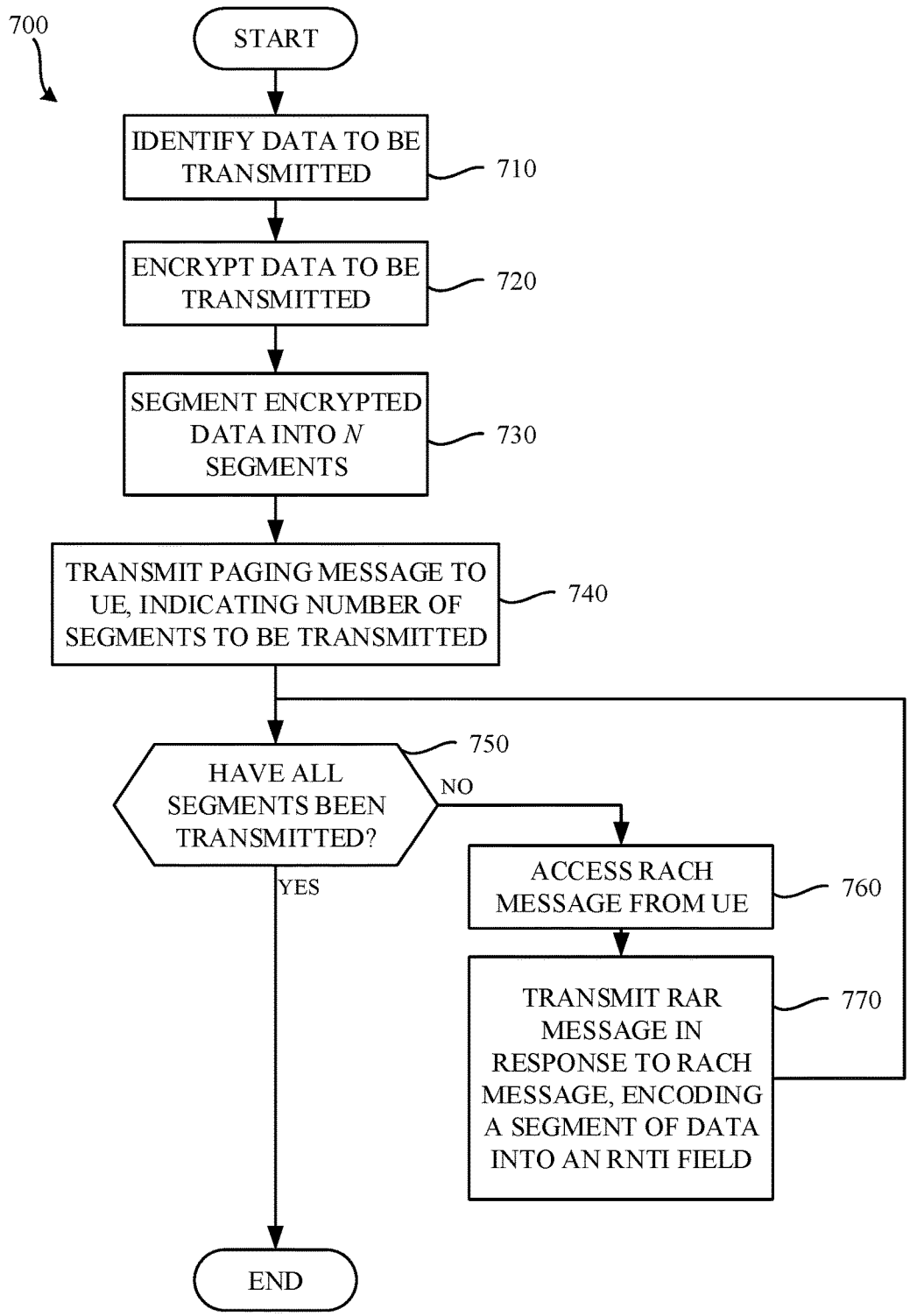
FIG. 7 is a flowchart representative of example machine-readable instructions which may be executed to implement the example node of FIG. 1 to transmit downlink data.

Flowcharts representative of example machine readable instructions for implementing the example node 110 of FIG. 1 are shown in FIGS. 6, 7, and/or 9. In these examples, the machine readable instructions comprise a program(s) for execution by a processor such as the processor 1212 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program(s) and/or parts thereof could alternatively be executed by a device other than the processor 1112 and/or embodied in firmware or dedicated hardware. Further, although the example program(s) is/are described with reference to the flowchart(s) illustrated in FIGS. 6, 7, and/or 9, many other methods of implementing the example node 110 may alternatively be used. For example, the order of execution of the blocks may be changed, and/or some of the blocks described may be changed, eliminated, or combined.

As mentioned above, the example processes of FIGS. 5, 6, 7, 8, 9, and/or 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 5, 6, 7, 8, 9, and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 5 is a flowchart representative of example machine-readable instructions 500 which may be executed to implement the example UE 105 of FIG. 1 to transmit uplink data. The example program of FIG. 5 begins when the example processor 142 of the example UE 105 identifies data to be transmitted (Block 510). In the illustrated example, the example processor 142 identifies that data is to be transmitted by interacting with the device functionality 145 of the UE 105. For example, if the UE were a security camera, the processor 142 may identify that, for example, a threshold amount of time has passed since transmission of a prior image, motion within a field of a few was detected, etc. to trigger transmission of an image from the device functionality 145 (e.g., an image sensor) to the Internet 120.

In the illustrated example of FIG. 5, the example processor 142 encrypts the data to be transmitted (Block 520). In examples disclosed herein, RACH messages are transmitted in the clear. That is, other devices that might monitor for and/or otherwise be able to receive the RACH messages transmitted by the UE 105 might be able to eavesdrop on communications between the UE 105 and the node 110. Encrypting the data reduces the likelihood that another device might be able to determine the data transmitted between the UE 105 and the node 110.

The example uplink data mapper 136 segments the encrypted data into N segments (Block 530). In the illustrated example of FIG. 5, the segments are six bits in length, corresponding to six bits available in a preamble of a RACH message. However, any other length may additionally or alternatively be used. In some examples, the RACH message is modified to include an additional data field for transmission of data from the UE 105 to the node 110. In some examples, the additional data field of the RACH message is used in lieu of the preamble of the RACH message. However, in some examples, the additional data field of the RACH message is used in addition to the preamble of the RACH message.

The example connectionless mode initiator 133 selects a six bit preamble (Block 540). In the illustrated example of FIG. 5, the six bit preamble is a random preamble (out of sixty four possible preambles). However, any other approach to selecting a preamble may additionally or alternatively be used. For example, one or more of the sixty four preambles may be reserved for initiating the connectionless mode. The example connectionless mode initiator 133 then transmits, via the radio transceiver 130, a first sequence of N RACH messages to indicate that the UE will be subsequently transmitting a second sequence N RACH messages (Block 550). In the illustrated example of FIG. 5, the number of messages of the first sequence (N) identifies to the node 110 a number of RACH messages that the node 110 should expect to receive from the UE 105. However, any other approach to indicating, to the node 110, a number of messages to be transmitted may additionally or alternatively be used. For example, the example connectionless mode initiator 133 may encode the number of messages to be transmitted into a preamble of a RACH message sent to the node 110 by the radio transceiver 130. In some examples, the data is segmented into a minimum number of segments. Transmitting too few segments might not indicate the UE's intention to transmit data using the connectionless mode.

In the illustrated example of FIG. 5, the connectionless mode initiator 133 uses the same preamble in each of the successive RACH messages indicating that the UE 105 will be communicating in connectionless mode. However, in some examples, a pattern of preambles may be used to indicate that the UE 105 will be communicating in connectionless mode. For example, the connectionless mode initiator 133 may transmit a first preamble, followed by a second preamble different from the first preamble, followed by the first preamble, followed by the second preamble, etc.

The example uplink data mapper 136 then transmits, via the radio receiver 130, a second sequence of N RACH messages (Block 560). In the illustrated example of FIG. 5, each successive RACH message of the second sequence includes a respective successive segment of the encrypted data.

In some examples, the node 110, in response to receiving RACH message(s) from the UE 105, replies with a RAR message. The RAR message may be used to, for example, acknowledge the RACH message(s). In some examples, the UE 105 may re-transmit RACH messages if, for example, no RAR acknowledgment message is received in connection with a transmitted RACH message.

FIG. 6 is a flowchart representative of example machine-readable instructions 600 which may be executed to implement the example node 110 of FIG. 1 to receive uplink data. The example program 600 of FIG. 6 begins when the example connectionless mode request identifier 153 attempts to identify that the UE 105 is indicating that it will communicate data in connectionless mode (i.e., without establishing a bearer with the EPC 115). To identify whether the example UE 105 has indicated that data will be communicated in connectionless mode, the example connectionless mode request identifier 153 initializes the counter 154 (Block 605). In examples disclosed herein, the example counter 154 is initialized to one. However, the example counter 154 may be initialized to any other value such as, for example, zero, two, etc. In the illustrated example of FIG. 6, the example counter 154 is used to determine a number of messages that are to be received from the UE 105.

The example connectionless mode request identifier 153, via the radio transceiver 150, accesses a first RACH message received from the UE 105 (Block 610) The example connectionless mode request identifier 153, via the radio transceiver 150, accesses a second RACH message received from the UE 105 (Block 615). The example connectionless mode request identifier 153 determines whether the preamble of the first RACH message matches the preamble of the second RACH message (Block 620). If the preamble from the first RACH message matches the preamble of the second RACH message (Block 620 returns a result of YES), the example connectionless mode request identifier 153 increments the example counter 154 (Block 625). The example connectionless mode request identifier 153 considers the second RACH message to be the first RACH message (Block 630). The example connectionless mode request identifier 153 then receives a (subsequent) second RACH message from the UE 105 (Block 615).

The example process of blocks 615, 620, 625, 630 is repeated until the example connectionless mode request identifier 153 determines that the preamble of the first RACH messages does not match the preamble of the second RACH message (Block 620 returns a result of NO). Determining that the preambles do not match indicates that the UE 105 has completed indicating that it will transmit data using the connectionless mode. In the illustrated example of FIG. 6, the number of messages received having the same preamble (as stored in the counter 154) indicates the number of subsequent messages that the UE 105 will transmit.

The example connectionless mode request identifier 153 determines whether the value of the counter 154 is greater than a threshold value (Block 635). If, for example, the counter 154 indicated a number of messages below the threshold number of messages (e.g., below ten messages, below twenty messages, etc.), the example connectionless mode request identifier 153 may determine that the repeated preambles do not indicate that the UE 105 will transmit using the connectionless mode. Using a threshold ensures that coincidental matching preambles do not result in subsequent messages being treated as data messages when they are not intended as such. If the example connectionless mode request identifier 153 identifies that the threshold has not been met (Block 635 returns a result of NO), the example connectionless mode request identifier 153 re-initializes the counter 154 (Block 605). The example process of blocks 605, 6110, 615, 620, 625, 630, and 635 is repeated until a sequence of matching preambles having the threshold number of messages is met (Block 635 returns a result of YES).

In the illustrated example of FIG. 6, the connectionless mode request identifier 153 identifies a connectionless mode request when matching preambles are received from the UE 105. However, any other approach to identifying that the UE 105 has indicated that it will transmit data using the connectionless mode may additionally or alternatively be used. For example, the connectionless mode request identifier 153 may monitor incoming RACH messages to identify a pattern of preambles indicating that the UE 105 will transmit data using the connectionless mode. In some examples, a particular preamble may be reserved for indication of use of the connectionless mode.

Moreover, in the illustrated example of FIG. 6, the connectionless mode request identifier 153 identifies a number of messages to be expected from the UE 105 by counting the number of matching preambles received from the UE 105. However, any other approach to identifying a number of messages to be expected from the UE 105 may additionally or alternatively be used. For example, a sequence of preambles (e.g., a sequence of preambles that encode a number) may be decoded to determine the number of messages that the UE 105 has indicated that the UE 105 will transmit using the connectionless mode.

Upon identifying that the connectionless mode will be used (Block 620 returns a result of NO, followed by Block 635 returning a result of YES), the example uplink data de-mapper 162 adds the preamble of the second RACH message (e.g., the message that was identified as having a non-matching preamble) to the buffer 163 (Block 640). Via the radio transceiver 150, the uplink data de-mapper 162 receives a subsequent RACH message from the UE 105 (Block 645). The example uplink data de-mapper 162 identifies the preamble of the subsequent RACH message and adds the preamble of the subsequent RACH message to the buffer 163 (Block 650). In the illustrated example of FIG. 6, the example uplink data de-mapper adds the preamble of the subsequent RACH message to the buffer 163 by appending the preamble of the subsequent RACH message to any preambles previously stored in the buffer 163 (e.g., the preamble from the second RACH message). The connectionless mode request identifier 153 decrements the counter 154 (Block 655). The example uplink data de-mapper 162 determines whether the counter 154 is less than or equal to zero (Block 660). Determining when the counter has been decremented to zero is useful for identifying that the UE 105 has completed transmitting data in the connectionless mode. If the counter 154 is not less than or equal to zero (e.g., the counter 154 is greater than zero) (Block 660 returns a result of NO), the example process of blocks 645, 650, 655, and 660 is repeated until the counter 154 is less than or equal to zero (e.g., all messages have been received from the UE 105) (Block 660 returns a result of YES). The node 110 then considers the UE 105 to have exited the connectionless mode.

The example processor 165 decrypts the data stored in the buffer 163 (Block 665). In some examples, the data transmitted by the UE 105 may not be encrypted and, as such, the decryption process of Block 655 may be omitted. The example processor 165 causes the network communicator 168 to transmit the decrypted data to its destination (e.g., the server 121 of the IoT service provider). In examples disclosed herein, the data may be formatted as an Ethernet packet and may specify a destination address (e.g., in a header of the received data). However, any other approach to specifying a destination may additionally or alternatively be used.

FIG. 7 is a flowchart representative of example machine-readable instructions 700 which may be executed to implement the example node 110 of FIG. 1 to transmit downlink data. The illustrated example of FIG. 7 corresponds to the activities of the node 110 as shown in FIG. 3. In particular, in the illustrated example of FIG. 7, a paging message that indicates a number of segments to be transmitted in a downlink fashion is used.

The example process of FIG. 7 begins when the example processor 165 identifies data to be transmitted to the UE 105 (Block 710). In the illustrated example of FIG. 7, the example processor 165 receives data from a source (e.g., the server 121 of the IoT service provider) via the network communicator 168. The example processor 165 encrypts the data to be transmitted to the UE 105 (Block 720). Encrypting the data reduces the likelihood that a device other than the intended UE 105 may be able to access the data to be transmitted to the UE 105.

The example downlink data encoder 159 segments the encrypted data into segments (Block 730). In the illustrated example of FIG. 7, the example downlink data encoder 159 segments the data into sixteen bit segments, corresponding to the sixteen bit length of the RNTI field of a RAR message that the data will be transmitted in. However, any other segment length and/or messaging fields may additionally or alternatively be used.

The example connectionless mode instructor 156 transmits, via the radio transceiver 150, a paging message to the UE 105 (Block 740). In the illustrated example of FIG. 7, the paging message indicates (a) that connectionless mode will be used to transmit downlink data, and (b) a number of segments to be transmitted. However, any other approach to indicating that the connectionless mode will be used, and/or indicating a number of segments to be transmitted may additionally or alternatively be used. For example, a first data message (e.g., a RAR message transmitted in association with block 770) may be used to specify a number of segments to be transmitted. In some examples, a continue indicator is included in the downlink message(s) (e.g., the RAR message transmitted in association with block 770) to indicate whether additional downlink segments are to be transmitted. In response to the paging message, the UE 105 transmits a RACH message requesting the downlink data.

The example downlink data encoder 159 determines whether all segments have been transmitted to the UE 105 (Block 750). If additional segments are to be transmitted, the example downlink data encoder 159 accesses a RACH message received from the UE 105 (Block 760). In response to the RACH message, the example downlink data encoder 159 transmits a RAR message (Block 770). In the illustrated example of FIG. 7, the example downlink data encoder 159 encodes a segment of the encrypted data into an RNTI field of the RAR message. However, in some examples, additional data fields such as, for example, a time adjustment (TA) field may additionally or alternatively be used to transmit additional data in the RAR message. In some examples, the RAR message may be modified to include additional data fields that are not otherwise transmitted as part of a RAR message to include. Such additional fields may be used to transmit additional data in the RAR message. The example process of blocks 750, 760, and 770 is repeated until all data segments have been transmitted to the UE 105. In some examples, the RACH messages received from the UE are used to acknowledge receipt of the downlink data. In some examples, the RACH messages received from the UE are used to confirm the data received via the downlink message by, for example, returning a hash value (e.g., a cyclical redundancy check (CRC) code) for the received data. Having transmitted all downlink data, the example process of FIG. 7 terminates.

FIG. 8 is a flowchart representative of example machine-readable instructions 800 which may be executed to implement the example UE 105 of FIG. 1 to receive downlink data. The illustrated example of FIG. 8 corresponds to the activities of the UE 105 as shown in FIG. 3. In particular, in the illustrated example of FIG. 8, a paging message that indicates a number of segments to be transmitted in a downlink fashion is received from the node 110.

The example program 800 of FIG. 8 begins when the downlink data decoder 139 receives, via the radio transceiver 130, a paging message (Block 805). In the illustrated example of FIG. 8, the paging message indicates (a) that connectionless mode will be used to transmit downlink data, and (b) a number of segments to be transmitted a number of segments to be transmitted to the UE 105 by the node 110. The paging message received at block 805 corresponds to the paging message transmitted in association with block 740 of FIG. 7. The example downlink data decoder initializes the counter 141 to the number of segments identified by the paging message (Block 810). Upon receipt of each segment, the counter 141 will subsequently be decremented (e.g., see Block 840). The example downlink data decoder 139 determines whether the counter 141 is less than or equal to zero (Block 815).

If the counter 141 has not yet reached zero (Block 815 returns a result of NO), the example downlink data decoder 139 transmits, via the radio transceiver 130, a RACH message requesting the downlink data (Block 820). As shown in the illustrated example of FIG. 3, in response to the RACH message (e.g., the RACH message 340), the example node 110 responds with a RAR message (e.g., the RAR message 350). The example downlink data decoder 139 accesses the RAR message in response to the RACH message (Block 825). In the illustrated example of FIG. 8, the example downlink data decoder 139 extracts data from the RNTI field of the RAR message (Block 830). However, in some examples, additional data fields such as, for example, a time adjustment (TA) field, may additionally or alternatively be used to transmit additional data in the RAR message. As such, the example downlink data decoder 139 may extract data from any other field.

The example downlink data decoder 139 adds the received data to the buffer 140 (Block 835). In examples disclosed herein, the received data is appended to data previously stored in the buffer to aggregate the data spread across multiple messages received from the node 110. However, any other approach to aggregating data received from the node 110 may additionally or alternatively be used. The example downlink data decoder 139 decrements the counter 141 to indicate that a segment has been received. The example downlink data decoder 139 then determines whether the counter 141 is less than or equal to zero (Block 815). The example process of blocks 815 through 840 is repeated until the counter is decremented to zero (e.g., all messages have been received from the node 110).

The example processor 142 then decrypts the data stored in the data buffer (Block 845). The example processor 142 then processes the received data (Block 850). In examples disclosed herein, the processor 142 interacts with the device functionality 145 to process the received data. In some examples, the downlink data may be used to, for example, instruct the device functionality 145 of the UE 105 to perform an action. For example, if the UE 105 were a thermostat, the downlink data may be an instruction to set a desired temperature. However, any other information and/or instructions may be included in the downlink data. The example process 800 of FIG. 8 then terminates.

Figure 9:
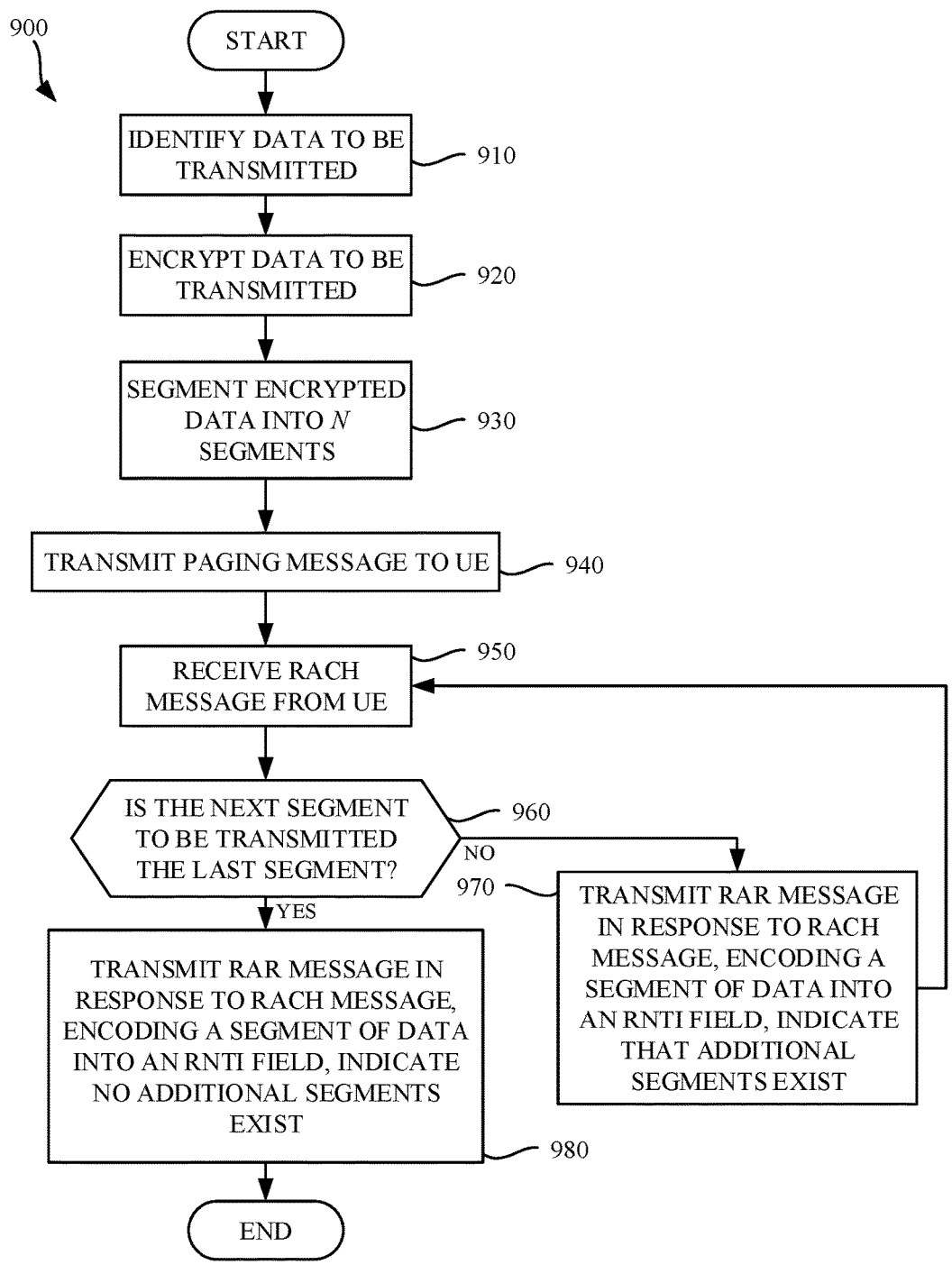
FIG. 9 is a flowchart representative of example machine-readable instructions which may be executed to implement the example node of FIG. 1 to transmit downlink data.

FIG. 9 is a flowchart representative of example machine-readable instructions 900 which may be executed to implement the example node 110 of FIG. 1 to transmit downlink data. The illustrated example of FIG. 9 corresponds to the activities of the node 110 as shown in FIG. 4. In particular, in the illustrated example of FIG. 9, a paging message that does not indicate a number of segments to be transmitted in a downlink fashion is used.

The example process of FIG. 9 begins when the example processor 165 identifies data to be transmitted to the UE 105 (Block 910). In the illustrated example of FIG. 9, the example processor 165 receives data from a source (e.g., the server 121 of the IoT service provider) via the network communicator 168. The example processor 165 encrypts the data to be transmitted to the UE 105 (Block 920). Encrypting the data reduces the likelihood that a device other than the intended UE 105 may be able to access the data to be transmitted to the UE 105.

The example downlink data encoder 159 segments the encrypted data into segments (Block 930). In the illustrated example of FIG. 9, the example downlink data encoder segments the data into sixteen bit segments, corresponding to the sixteen bit length of the RNTI field of a RAR message that the data will be transmitted in. However, any other segment length and/or messaging fields may additionally or alternatively be used.

The example connectionless mode instructor 156 transmits, via the radio transceiver 150, a paging message to the UE 105 (Block 940). In the illustrated example of FIG. 9, the paging message indicates (a) that connectionless mode will be used to transmit downlink data, and (b) other configuration information (e.g., an encoding type, an encryption type, etc.) for the downlink communication. However, any other approach to indicating that the connectionless mode will be used, and/or indicating configuration information for the connectionless mode may additionally or alternatively be used. In the illustrated example of FIG. 9, in lieu of an indication of the number of segments to be transmitted, a continue indicator is included in the downlink message(s) (e.g., the RAR message transmitted in association with block 770) to indicate whether additional downlink segments are to be transmitted. In response to the paging message, the UE 105 transmits a RACH message requesting the downlink data.

The example downlink data encoder receives the RACH message from the UE 105 (Block 950). The example downlink data encoder 159 determines whether the next segment to be transmitted is the last segment (Block 960). If the example downlink data encoder 159 determines that additional segments will be transmitted after the next segment (e.g., Block 960 returns a result of NO), the example downlink data encoder 159 transmits, via the radio receiver 150, a RAR message in response to the RACH message (e.g., the RACH message received in association with Block 950). In the illustrated example of FIG. 9, the example downlink data encoder 159 encodes a segment of the data to be transmitted into an RNTI field of the RAR message of block 970. However, in some examples, additional data fields such as, for example, a time adjustment (TA) field may additionally or alternatively be used to transmit additional data in the RAR message. The example RAR message of block 970 includes an indication that additional segments exist for transmission. The example downlink data encoder 159 then awaits a next RACH message from the UE (Block 950).

The example process of blocks 950, 960, and 970 is repeated until the next segment to be transmitted is the last segment (Block 960 returns a result of YES). The example downlink data encoder 159 transmits a final RAR message in response to the RACH message (e.g., the RACH message of Block 950 corresponding to the last iteration of the process of block 950, 960, and 970) (Block 980). In the illustrated example of FIG. 9, the example downlink data encoder 159 encodes a segment of the data to be transmitted into an RNTI field of the RAR message of block 970. In the illustrated example of FIG. 9, the example RAR message indicates that no additional segments will be transmitted. In the illustrated example of FIG. 9, the indication that no additional segments will be transmitted is implemented by a continue flag within the RAR message. Having transmitted all downlink data, the example process of FIG. 9 terminates.

Figure 10:
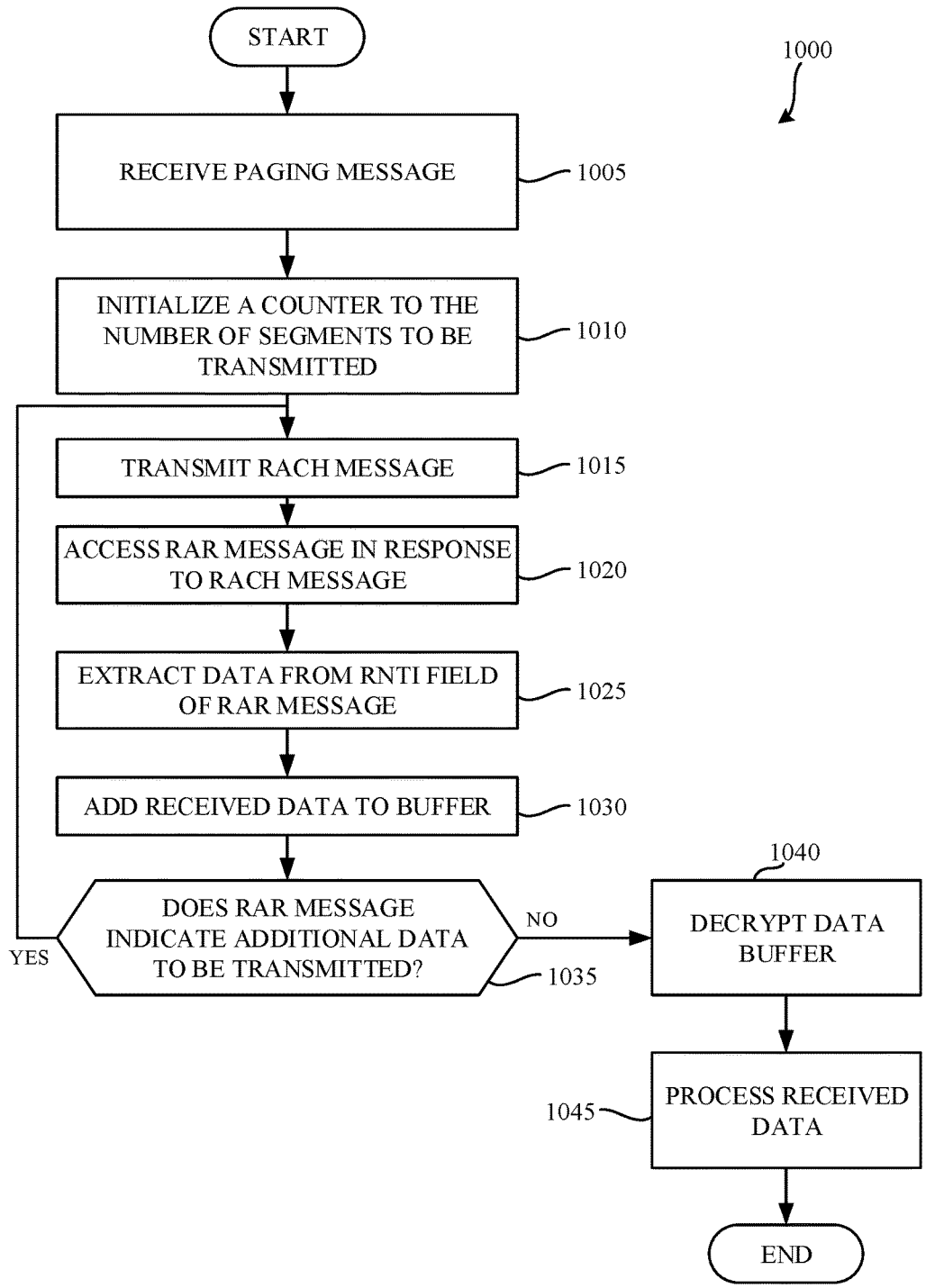
FIG. 10 is a flowchart representative of example machine-readable instructions which may be executed to implement the example UE of FIG. 1 to receive downlink data.

FIG. 10 is a flowchart representative of example machine-readable instructions 1000 which may be executed to implement the example UE 105 of FIG. 1 to receive downlink data. The illustrated example of FIG. 10 corresponds to the activities of the UE 105 as shown in FIG. 4. In particular, in the illustrated example of FIG. 10, a paging message that does not indicate a number of segments to be transmitted in a downlink fashion is received from the node 110.

The example program 1000 of FIG. 10 begins when the downlink data decoder 139 receives, via the radio transceiver 130, a paging message (Block 1005). In the illustrated example of FIG. 10, the paging message does not indicate a number of segments to be transmitted to the UE 105 by the node 110. In the illustrated example of FIG. 10, the example paging message indicates (a) that connectionless mode will be used to transmit downlink data, and (b) other configuration information (e.g., an encoding type, an encryption type, etc.) for the downlink communication. The paging message received at block 1005 corresponds to the paging message transmitted in association with block 940 of FIG. 9.

The example downlink data decoder 139 transmits, via the radio transceiver 130, a RACH message requesting the downlink data (Block 1015). As shown in the illustrated example of FIG. 4, in response to the RACH message (e.g., the RACH message 440), the example node 110 responds with a RAR message (e.g., the RAR message 450). The example downlink data decoder 139 accesses the RAR message in response to the RACH message (Block 1020). In the illustrated example of FIG. 10, the example downlink data decoder 139 extracts data from the RNTI field of the RAR message (Block 1025). However, in some examples, additional data fields such as, for example, a time adjustment (TA) field, may additionally or alternatively be used to transmit additional data in the RAR message. As such, the example downlink data decoder 139 may extract data from any other field.

The example downlink data decoder 139 adds the received data to the buffer 140 (Block 1030). In examples disclosed herein, the received data is appended to data previously stored in the buffer to aggregate the data spread across multiple messages received from the node 110. However, any other approach to aggregating data received from the node 110 may additionally or alternatively be used.

The example downlink data decoder 139 determines whether the RAR messages indicates that additional segments exist to be transmitted from the node 110 to the UE 105 (Block 1035). In the illustrated example of FIG. 10, the example downlink data decoder 139 inspects the RAR message for an indicator of whether additional messages are to be transmitted. In some examples, the additional indicator is included in the RNTI field (e.g., one of the sixteen bits of the RNTI field is reserved as a continue indicator). However, the continue indicator may be included in any other part and/or location of the RAR message. For example, the continue indicator may be included in a time adjustment (TA) field. The example process of blocks 1015 through 1035 continues until the downlink data decoder 139 determines that no additional data is to be transmitted (Block 1035 returns a result of NO).

The example processor 142 then decrypts the data stored in the data buffer 140 (Block 1040). The example processor 142 then processes the received data (Block 1045). In examples disclosed herein, the processor 142 interacts with the device functionality 145 to process the received data. In some examples, the downlink data may be used to, for example, instruct the device functionality 145 of the UE 105 to perform an action. For example, if the UE 105 were a thermostat, the downlink data may be an instruction to set a desired temperature. However, any other information and/or instructions may be included in the downlink data. The example process 1000 of FIG. 10 then terminates.

Figure 11:
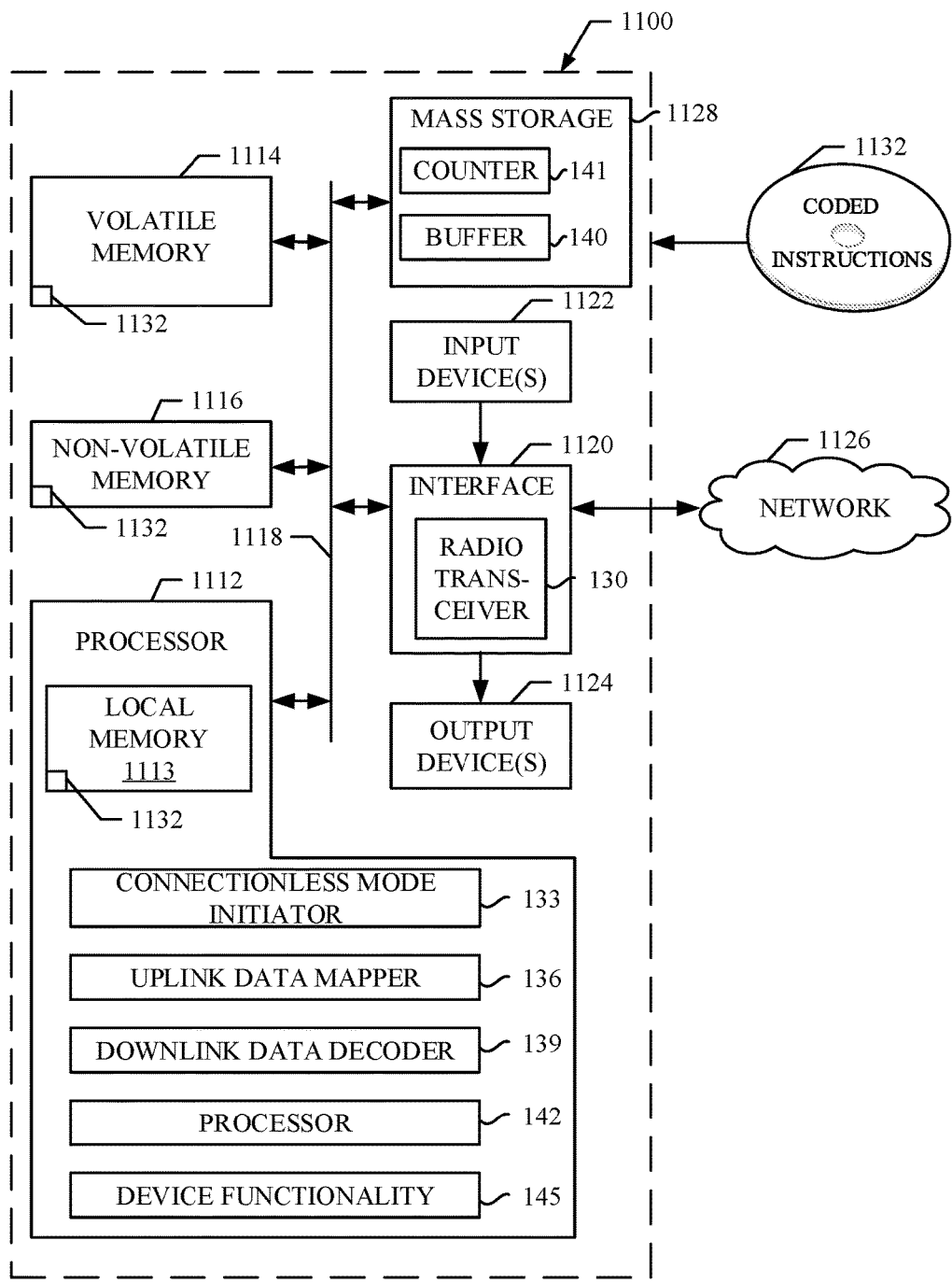
FIG. 11 is a block diagram of an example processor platform capable of executing the example machine-readable instructions of FIGS. 5, 8, and/or 10 to implement the example UE of FIG. 1.

FIG. 11 is a block diagram of an example processor platform 1100 structured to execute the instructions of FIGS. 5, 8, and/or 10 to implement the example UE 105 of FIG. 1. The processor platform 1100 can be, for example, an IoT device (e.g., a thermostat, a security camera, a refrigerator, etc.), a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). In the illustrated example, the processor 1112 implements the example connectionless mode initiator 133, the example uplink data mapper 136, the example downlink data decoder 139, the example processor 142, and/or the example device functionality 145. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.). In examples disclosed herein, the interface circuit 1120 implements the example radio transceiver 130.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives. In the illustrated example of FIG. 11, the example mass storage 1128 implements the example buffer 140 and/or the example counter 141.

The coded instructions 1132 of FIGS. 5, 8, and/or 10 may be stored in the mass storage device 1128, in the volatile memory 1114, in the non-volatile memory 1116, and/or on a removable tangible computer readable storage medium such as a CD or DVD.

Figure 12:
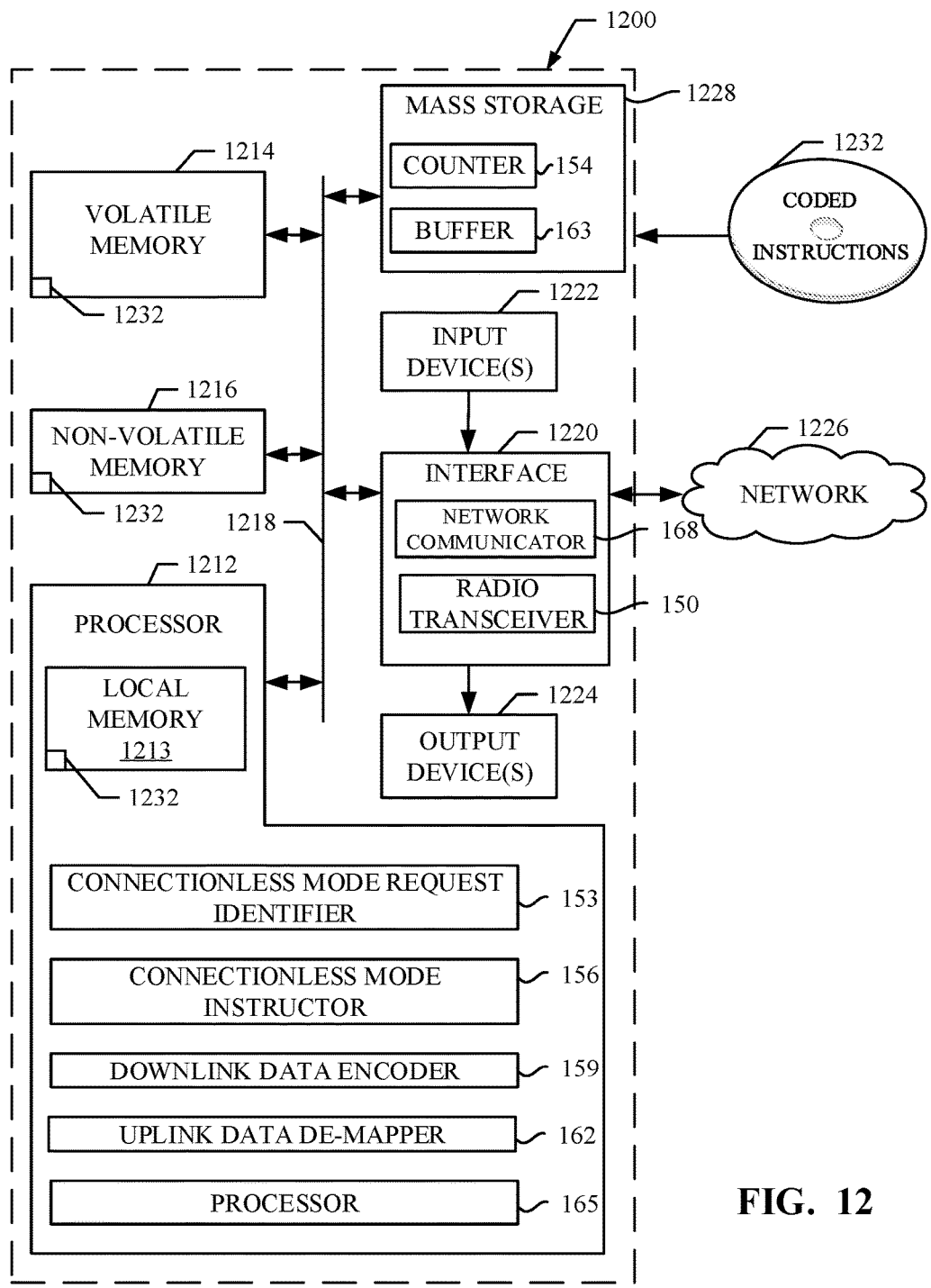
FIG. 12 is a block diagram of an example processor platform capable of executing the example machine-readable instructions of FIGS. 6, 7, and/or 9 to implement the example node of FIG. 1.

FIG. 12 is a block diagram of an example processor platform 1100 structured to execute the instructions of FIGS. 6, 7, and/or 9 to implement the example node 110 of FIG. 1. The processor platform 1200 can be, for example, an eNodeB, a server, a personal computer, an Internet appliance, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). In the illustrated example, the processor 1212 implements the example connectionless mode request identifier 153, the example connectionless mode instructor 156, the example downlink data encoder 159, the example uplink data de-mapper, and/or the example processor 165. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.). In examples disclosed herein, the interface circuit 1220 implements the example radio transceiver 150 and/or the network communicator 168.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. In the illustrated example of FIG. 12, the example mass storage 1228 implements the example buffer 163 and/or the example counter 154.

The coded instructions 1232 of FIGS. 6, 7, and/or 9 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus, and articles of manufacture relieve the EPC of the need to establish a bearer with a UE for transmission of small amounts of infrequent data. As a result, the efficiency of the EPC is enhanced, as the processing and/or signaling requirements of the EPC are reduced.

Moreover, bandwidth efficiency of the UE is improved, as the UE does not need to spend time establishing a bearer with the EPC but, instead, can proceed to transmit data using the connectionless mode as soon as the data is ready to be transmitted. Such an approach conserves battery by not spending energy establishing a bearer and/or waiting for a bearer to be established.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a processor; and
a memory to store machine readable instructions that, when executed by the processor, cause the processor to perform operations comprising:
identifying that data exists to be transmitted to a destination address, the destination address encoded into the data;
transmitting a first sequence of random access channel messages, the first sequence of random access channel messages including a first number of random access channel messages corresponding to a second number of messages in a second sequence of random access channel messages that will be used to transmit the data, the first sequence of random access channel messages to be transmitted without establishing a bearer with a wireless network;
encoding the data into corresponding preambles of random access channel messages in the second sequence of random access channel messages; and
transmitting the second sequence of random access channel messages without establishing the bearer with the wireless network.

2. The apparatus of claim 1, wherein the machine readable instructions, when executed by the processor, cause the processor to identify the first number of messages that will be used to transmit the data.

3. The apparatus of claim 1, wherein each message in the first sequence of random access channel messages includes a same preamble.

4. The apparatus of claim 1, wherein the machine readable instructions, when executed by the processor, cause the processor to encrypt the data.

5. The apparatus of claim 1, wherein the machine readable instructions, when executed by the processor, cause the processor to segment the data into a plurality of segments.

6. The apparatus of claim 5, wherein each of the segments of the plurality of segments includes a maximum of six bits.

7. The apparatus of claim 1, wherein each message in the first sequence of random access channel messages include a corresponding preamble from a pattern of different preambles.

8. A tangible machine readable storage medium comprising instructions which, when executed, cause a machine to perform operations comprising:
identifying, at a user equipment, that data exists to be transmitted to a destination address, the destination address encoded into the data;
transmitting a first sequence of random access channel messages, the first sequence of random access channel messages including a first number of random access channel messages corresponding to a second number of messages in a second sequence of random access channel messages that will be used to transmit the data, the first sequence of random access channel messages to be transmitted without establishing a bearer with a wireless network;

encoding the data into corresponding preambles of random access channel messages in the second sequence of random access channel messages; and transmitting the second sequence of random access channel messages without establishing the bearer with the wireless network.

9. The tangible machine readable storage medium of claim 8, wherein the operations further include identifying a first number of messages that will be used to transmit the data.

10. The tangible machine readable storage medium of claim 8, wherein each message in the first sequence of random access channel messages includes a same preamble.

11. The tangible machine readable storage medium of claim 8, wherein the operations further include encrypting the data.

12. The tangible machine readable storage medium of claim 8, wherein the operations further include segmenting the data into a plurality of segments.

13. The tangible machine readable storage medium of claim 12, wherein each of the segments of the plurality of segments includes a maximum of six bits.

14. The tangible machine readable storage medium of claim 8, wherein each message in the first sequence of random access channel messages include a corresponding preamble from a pattern of different preambles.

15. A method of communicating data using a connectionless mode, the method comprising:

identifying, with a processor at a user equipment, that data exists to be transmitted to a destination address, the destination address encoded into the data;

transmitting, by the user equipment, a first sequence of random access channel messages, the first sequence of random access channel messages including a first number of random access channel messages corresponding to a second number of messages in a second sequence of random access channel messages that will be used to transmit the data, the first sequence of random access channel messages to be transmitted without establishing a bearer with a wireless network;

encoding, by the user equipment, the data into corresponding preambles of random access channel messages in the second sequence of random access channel messages; and transmitting, by the user equipment, the second sequence of random access channel messages without establishing the bearer with the wireless network.

16. The method of claim 15, further including identifying a first number of messages that will be used to transmit the data.

17. The method of claim 16, wherein each message in the first sequence of random access channel messages includes a same preamble.

18. The method of claim 16, wherein each message in the first sequence of random access channel messages include a corresponding preamble from a pattern of different preambles.

19. The method of claim 15, further including encrypting the data.

20. The method of claim 15, further including segmenting the data into a plurality of segments, each of the segments including a maximum of six bits.

* * * * *